(12) United States Patent
Woolston

(10) Patent No.: US 6,202,051 B1
(45) Date of Patent: Mar. 13, 2001

(54) FACILITATING INTERNET COMMERCE THROUGH INTERNETWORKED AUCTIONS

(76) Inventor: Thomas G. Woolston, 8408 Washington Ave., Alexandria, VA (US) 22309

(*) Notice: Subject to any disclaimer, the term of this patent is extended or adjusted under 35 U.S.C. 154(b) by 0 days.

(21) Appl. No.: 09/253,021

(22) Filed: Feb. 19, 1999

Related U.S. Application Data

(62) Division of application No. 09/166,779, filed on Oct. 6, 1998, which is a continuation of application No. 08/554,704, filed on Nov. 7, 1995, now Pat. No. 5,845,265, and a continuation of application No. 08/427,820, filed on Apr. 26, 1995.

(51) Int. Cl.[7] .................................................... G06F 17/60
(52) U.S. Cl. .................................. 705/27; 705/26; 705/37
(58) Field of Search ................................ 705/27, 37, 26, 705/35, 36, 39; 235/383, 381

(56) References Cited

U.S. PATENT DOCUMENTS

| | | | |
|---|---|---|---|
| 3,581,072 | 5/1971 | Nymeyer | 705/37 |
| 4,247,759 | 1/1981 | Yuris et al. | 235/381 |
| 4,270,042 | 5/1981 | Case | 235/379 |
| 4,346,442 | 8/1982 | Musmanno | 705/36 |
| 4,449,186 | 5/1984 | Kelly et al. | 705/205 |
| 4,553,222 | 11/1985 | Kurland et al. | |
| 4,674,044 | 6/1987 | Kalmus et al. | 705/37 |
| 4,677,552 | 6/1987 | Sibley, Jr. | 705/37 |

(List continued on next page.)

FOREIGN PATENT DOCUMENTS

| | | |
|---|---|---|
| 2658635 | 8/1991 | (FR). |
| 9300266 | 9/1994 | (NL). |
| 9215174 | 9/1992 | (WO). |
| 9634356 | 10/1996 | (WO). |

OTHER PUBLICATIONS

Ken Koepper, "Room Inventory Auctioning: The Next CRS Generation", Lodging, Jan. 1990, pp. 26–30.*

Johnson et al., "Automated Double Oral Auctions Using IBM PC Network", Association for Computing Machinery, CSC '86 Cincinnati Proceedings, p. 507, date Feb. 1986.

American Law Institute, Draft–Uniform Commercial Code Revised Article 2 (Sales), Parts 2, 3 and 7, pp. 1–15, Jan. 4, 1996, printed from http://www.kentlaw.edu/ulc/uniform/uc-cart2/chapt2/ucc2c237.html.

(List continued on next page.)

Primary Examiner—Kevin J. Teska
Assistant Examiner—Demetra R. Smith
(74) Attorney, Agent, or Firm—Burns, Doane, Swecker & Mathis L.L.P.

(57) ABSTRACT

Auctioning an uniquely identified item (e.g., used goods or collectibles) with a computerized electronic database of data records on the Internet includes creating a data record containing a description of an item, generating an identification code to uniquely identify the item, and scheduling an auction for the item at the computerized database of records. The item is presented for auction to an audience of participants through a worldwide web mapping module executing in conjunction with the computerized database. The data record connotes an ownership interest in the item to a seller participant on the computerized electronic database of data records. The worldwide web mapping module translates information from the data record on the computerized database of records to a hypertext markup language (HTML) format for presentation through the Internet. Bids are received on the item from participants on the Internet through an auction process that executes in conjunction with the computerized database of data records. Auctioning of the item is terminated when the auction process reaches predetermined criteria. The auction participant is notified of the high bid in the auction process. The unique identification code is provided to the auction participant with the high bid to uniquely identify the item.

52 Claims, 13 Drawing Sheets

U.S. PATENT DOCUMENTS

| | | | |
|---|---|---|---|
| 4,739,478 | 4/1988 | Roberts et al. | 705/38 |
| 4,742,457 | 5/1988 | Leon et al. | 705/35 |
| 4,751,640 | 6/1988 | Lucas et al. | 705/36 |
| 4,789,928 | 12/1988 | Fujisaki | 705/37 |
| 4,799,156 | 1/1989 | Shavit et al. | 705/26 |
| 4,823,265 | 4/1989 | Nelson | 705/35 |
| 4,876,648 | 10/1989 | Lloyd | 705/38 |
| 4,885,685 | 12/1989 | Wolfberg et al. | 705/14 |
| 4,903,201 | 2/1990 | Wagner | 705/37 |
| 4,910,676 | 3/1990 | Alldredge | 705/37 |
| 4,992,940 | 2/1991 | Dworkin | 705/26 |
| 5,021,953 | 6/1991 | Webber et al. | 705/6 |
| 5,063,507 | 11/1991 | Lindsey et al. | 705/26 |
| 5,101,353 | 3/1992 | Lupien et al. | 705/37 |
| 5,136,501 * | 8/1992 | Silverman et al. | 705/37 |
| 5,168,446 | 12/1992 | Wiseman | 705/37 |
| 5,191,613 | 3/1993 | Graziano et al. | 380/25 |
| 5,193,056 | 3/1993 | Boes | 705/36 |
| 5,206,803 | 4/1993 | Vitagliano et al. | 705/39 |
| 5,235,680 | 8/1993 | Bijnagte | 707/10 |
| 5,237,500 | 8/1993 | Perg et al. | 705/35 |
| 5,239,462 | 8/1993 | Jones et al. | 705/38 |
| 5,243,515 | 9/1993 | Lee | 705/37 |
| 5,258,908 | 11/1993 | Hartheimer et al. | 705/37 |
| 5,262,942 | 11/1993 | Earle | 705/37 |
| 5,283,731 | 2/1994 | Lalonde et al. | 705/1 |
| 5,285,383 | 2/1994 | Lindsey et al. | 705/26 |
| 5,305,200 | 4/1994 | Hartheimer et al. | 705/37 |
| 5,323,315 | 6/1994 | Highbloom | 705/38 |
| 5,325,297 | 6/1994 | Bird et al. | 707/530 |
| 5,329,589 | 7/1994 | Fraser et al. | 379/91.02 |
| 5,347,306 | 9/1994 | Nitta | 348/15 |
| 5,375,055 | 12/1994 | Togher et al. | 705/37 |
| 5,394,324 | 2/1995 | Clearwater | 705/8 |
| 5,424,944 | 6/1995 | Kelly et al. | 705/28 |
| 5,426,281 | 6/1995 | Abecassis | 235/379 |
| 5,451,998 | 9/1995 | Hamrick | 348/13 |
| 5,465,291 | 11/1995 | Barrus et al. | 379/67.1 |
| 5,526,479 | 6/1996 | Barstow et al. | 345/473 |
| 5,557,518 | 9/1996 | Rosen | 380/24 |
| 5,561,707 | 10/1996 | Katz | 379/88.16 |
| 5,664,111 * | 9/1997 | Nahan et al. | 705/27 |
| 5,752,238 * | 5/1998 | Dedrick | 705/14 |
| 5,771,354 | 6/1998 | Crawford | 709/229 |
| 5,845,265 | 12/1998 | Woolston | 705/37 |
| 5,870,552 * | 2/1999 | Dozier et al. | 709/219 |

OTHER PUBLICATIONS

Banâtre, J., et al., The Design And Building Of Enchère, A Distributed Electronic Marketing System, *Communications of the ACM*, Jan. 1986, vol. 29, No. 1, pp. 19–29.

"BookIt!," *Datalex Communications, USA, Inc.*, Web Ventures, Sep. 1999, http://www.webventures.com/bookit.

"BookIt!," *Web Ventures*, Sep. 1996, http://www.webventures.com/bookit.

Business Editors/Computer Writers, "Onsale: Onsale Brings Thrill of Auctions And Bargain Hunting Online: Unique Internet Retail Service Debuts With Week–Long Charity Auction For The Computer Museum In Boston," *Business Wire*, May 22, 1995, Dialog File 610, Accession No. 0489267.

Del Rosso, L., "Marketel Says It Plans To Launch Air Fare 'Auction' In Jun.," *Travel Weekly*, Apr. 29, 1991, vol. 50, No. 34, p. 1.

Del Rosso, L., "Ticket–Bidding Firm Closes Its Doors," *Travel Weekly*, Mar. 12, 1992, vol. 51, No. 21, p. 1.

Golden, F., "AAL's Riga Doubts Marketel's Appeal To Retailers; Chris Riga Of American Airlines," *Travel Weekly*, Nov. 13, 1989, vol. 48, No. 91, p. 4.

Gordon, M., "Auctions Become High Tech," *Dealer Business*, Mar. 1995, vol. 29, No. 7, p. 21.

Goulde, M., "Sun Microsystems Bringing Interactive Technology to the WWW," *Open Information Systems*, 10:3, p. 29, Mar. 1995.

Kuttner, R., "Computers May Turn The World Into One Big Commodities Pit," *Business Week*, Sep. 11, 1989, No. 3123, p. 17.

Maskery, M., "Car Auction Reaches Into Space," *Automotive News*, Dialog File 16, Accession No. 03482064, Nov. 25, 1991, p. 6.

Nimmer, R., "Electronic Contracting: Legal Issues," 14 *J. Marshall J. Computer& Info. L*. 211 (May 1996).

Pelline, J., "Travelers Bidding On Airline Tickets: SF Firm Offers Chance For Cut–Rate Fares," *The San Francisco Chronicle*, Aug. 19, 1991, Section A4.

Ritter, J., "Scope Of The Uniform Commercial Code: Computer Contracting Cases And Electronic Commercial Practices," 45 *Bus. Law*. 2533, Aug. 1990.

Schmitz, T., "California Computer Auctions—No Boon For Bargain Hunters," *Knight–Ridder/Tribune Business News*, Sep. 13, 1993, Dialog File 609, Accession No. 2096205.

Schrage, M., "An Experiment In Economic Theory: Labs Testing Real Markets," *The Los Angeles Times*, Nov. 26, 1989, Section B1.

Speidel, R., et al., "Impact Of Electronic Contracting On Contract Formation Under Revised UCC Article 2, Sales," C878 ALI–ABA 335, Dec. 9, 1993.

Whitmore, S., "Business On The Net: The New Gold Rush," *PC Week*, vol. 12, No. 43, p. 106, Oct. 30, 1995.

Business & Entertainment Editors; Save the Earth Foundation: Internet online Rock and Roll Art Auction Celebrating Earth Day is Declared Open to the World for one Month: Apr. 24, 1995.*

Open Systems Today; "Computer Museum Holds An Internet Auctioon"; May 9, 1984.*

Vernon L. Smith and Arlington W. Williams, "Experimental Market Economics"; Scientific American; Sep. 1991.*

Amy Sharp, "From Army Knives to Gold Coins"; Memphis Business Journal; v. 8 n. 10 s1 p. 10, Jul. 28, 1986.*

* cited by examiner

FIGURE 13

FACILITATING INTERNET COMMERCE THROUGH INTERNETWORKED AUCTIONS

This patent application seeks priority from Div. U.S. patent application Ser. No. 09/166,779 filed Oct. 6, 1998, which is a continuation of U.S. patent application Ser. No. 08/554,704, now U.S. Pat. No. 5,845,265, filed Nov. 7, 1995 and U.S. patent application Ser. No. 08/427,820 filed Apr. 26, 1995, all of which are incorporated herein by reference in their entirety.

BACKGROUND OF THE INVENTION

The present invention relates to used and collectible goods offered for sale by an electronic network of consignment stores. More specifically, the present invention may be an electronic "market maker" for collectable and used goods, a means for electronic "presentment" of goods for sale, and an electronic agent to search the network for hard to find goods. In a second embodiment to the present invention, a low cost posting terminal allows the virtual presentment of goods to market and establishes a two tiered market of retail and wholesale sales.

Certain items and used goods have a large following of collectors. These items include baseball cards, dolls, pens, watches, comic books, stamps, coins, and the like. It is well known to establish shops specializing in these items. It is also well-known to establish boards for the sale of used goods. And is known to sell new goods on a special television channel like the Home Shopping Channel.

The prior art does not provide a means to electronically market used goods or provide an avenue to allow participants to speculate on the price of collectable or used goods in an electronic market place. Moreover, the art does not show a way for small to medium size business to use a low cost posting terminal in conjunction with a market maker computer to collectively create a virtual market for used and collectible goods. Thus, to address the short comings of the art the present invention has the following objectives:

SUMMARY OF THE INVENTION

To establish a low cost computer means for a used good and/or consignment stores to establish a "trusted" computerized market for used and collectible goods.

To establish a computer means to administrate and provide inventory tracking to used good and/or consignment stores when the stores make a virtual presentment of a good to a computerized market and the good is sold at the virtual market and/or the good is sold through the store front.

To establish a computer means to double tier a computerized market for goods, where the first tier is a retail price and the second tier is a wholesale or dealer to dealer price and an authorized dealer has pre-approved access to the dealer-to-dealer price and may charge and display the retail price to a local store customer.

To establish a computer means for archiving records of transactions in a computerized market for collectible and used goods and distributing the archive to computer terminals that may then research and analyze valuation and price trends of collectible and used goods in the computerized market.

To establish a computer means for a used good store or consignment store to sell used goods and collectibles electronically and to provide the automatic electronic re-sale of goods purchased.

To establish a market for goods with a dominant electronic "market maker" node to allow collectors to speculate on the collectable goods market.

To provide the excitement of a "live" auction house type atmosphere to remote participants in a electronic auction.

To provide data analysis to the market makers of collectable good or consignment node users on the price, price movements, and quantity of collectable goods in the virtual market.

To provide an electronic agent interface for participants to search a plurality of consignment nodes to search for a used good or collectable item.

To provide a means to track down the owner of a particular used or collectable good.

Further, to provide a trusted network of consignment nodes that act as brokers to provide a means to electronically present a used good or collectable to an electronic market.

The foregoing objects and advantages of the invention are illustrative of those which can be achieved by the present invention and are not intended to be exhaustive or limiting of the possible advantages which can be realized. Thus, these and other objects and advantages of the invention will be apparent from the description herein or can be learned from practicing the invention, both as embodied herein or as modified in view of any variations which may be apparent to those skilled in the art. Accordingly the present invention resided in the novel methods, arrangements, combinations and improvements herein shown and described.

The present invention is a network of consignment nodes and a low cost easy to use posting terminal for the virtual presentment of goods to market. A consignment node is a computer database of used goods preferably operated by a used good, collectable shop keeper or a bailee. A posting terminal is a low cost easy to use computer and computer peripheral devices used by a small store owner to present goods to a computerized marker and track the sales of goods and control the posted inventory. All consignment nodes users or operators, hereinafter users, are "trusted" licensees or franchisers of the software and hardware necessary to create and operate a consignment node. Thus, the network provides a trusted means for consignment node users, e.g. shop keepers, to establish electronic markets for collectable goods, establish electronic auctions, establish a means for searching each others shops to locate hard to find collectibles items, and a means to electronically present goods to a market. The present invention will allow, or license, certain consignments nodes to become a dominant market maker for a particular class of goods, for example, a consignment node franchise may be given the rights to establish the dominant market for collectable antique pens. It is understood, a central market maker computer may be virtually divided into different markets with posting terminals used as the means for the market to obtain virtual title goods. Other consignment nodes, after taking physical possession of a good, may make an electronic presentment of that good to such a dominant consignment node market. Thus, a local collector of antique pens may bring a pen to a convenient consignment node in Smalltown, USA, the consignment network would allow this collector to electronically "present" his pen to the dominant market make node for antique pens in for example, Chicago. Participants, e.g. customers and collectors (hereinafter "participants"), may reach a dominant node's market, or any other consignment nodes electronic store, from his or her home by logging on from a PC located at the participant's home to their locally operated consignment node and reaching the distant consignment node through the network of consignment nodes. Thus, each consignment node user, e.g. shop keeper, has a potential participant, i.e. customer base, of all consignment node participants. In other words, a potentially huge customer base that incurs the minimal cost of a local consignment node connection may reach any other consignment node through the consignment node network. And local collector's may economically participate in the collectable markets by using local access to a convenient consignment node "trusted" bailee, and electronically presenting collectable goods to an electronic market.

A consignment node in a simple form may have a computer 10, a digital camera 12, a bar code scanner 14, a display 16, a printer 20, a keyboard 18, a database 22 and a network connection 26 collectively called hereinafter a consignment node. The present invention also has a user interface application program to execute an a user or participant's data terminal 28.

The consignment node may have four modes of operation: a software download mode, an auction mode, a market mode, and an agent mode. The software download mode allows a participant to log into the consignment node and receive a download of a participant interface application program. The auction mode allows a participant, from the participant interface application program, to log into a consignment node to partake in an electronic auction. The market mode allows a participant with the participant interface program to log into a consignment node to browse the consignment node database to search for a used or collectable good. The agent mode allows a participant to log into a consignment node to formulate a search request for a particular used good or collectable. The consignment node may search its own database for the requested good and/or generate agents to search and report back a search request of other consignment nodes.

The present invention may allow a participant to electronically purchase goods from a consignment node and to select whether the good should be shipped to a participant designed location or the participant may take electronic legal ownership of a good and post a new participant defined offer or reserve price. By the interaction of a plurality of participants buying and selling collectibles on a consignment node, posting "buy at" and "sell at" quantities and prices the consignment node may establish a market or become a "market maker" for collectable goods. A participant may also elect to electronically transfer or present a good to a different consignment node or market. This allows a participant to speculate with collectable goods on the consignment node network's different markets and not incur the shipping costs with physically moving the goods, while providing a trusted means to assure potential buyers of the good's bona fide availability and legal title.

The consignment node operator or purveyor, hereinafter referred to as the consignment node user, establishes his consignment node by creating a database of used goods or collectibles, hereinafter the term "goods" shall be used to reflect used goods, new goods and collectibles. The user takes the first good to be put on the database and invokes the consignment node software to create a data record. For example, the user owns a baseball card collector shop and the user wants to post his Babe Ruth collection. The user in this instance invokes the consignment node to "build the database mode" and the invention initializes the digital camera 15. The user then "photographs" or digitizes the image of the particular Babe Ruth card. The consignment system then displays an empty database record on the display to accept text information concerning the card.

The user fills out the display record with information concerning the particular Babe Ruth card. The consignment node verifies that enough information has been filled out in the displayed computer record, as well known to the electronic database arts, and accepts the record. It should be noted that the consignment node database record has data fields for the consignment node user to add value to his consignment node postings with subjective information such as condition of the card, special features such as autographed by Babe Ruth, and the like. Thus, the consignment node user may build business goodwill into his particular consignment node operation by establishing his own particular subjectivity and quality standards in item postings.

After the data record or the particular Babe Ruth card is accepted by the consignment node the system may print out a bar code label on the printer 20. The user may then put the particular Babe Ruth card into a plastic bag and affix the bar code label to the bag. The bar code labeling system becomes a useful inventory management tool discussed below.

It is understood in this first example that the consignment node user is the legal and equitable owner of the Babe Ruth card and that the user posted a reserve or offer price on the particular card at his posting. In a second illustrative example, a local resident would like to post, for example, his Frank Robinson baseball card. The resident brings his Frank Robinson card to the baseball card store and tells the consignment node user he would like to offer his Frank Robinson card for a consignment sale. Again, the consignment node user invokes the system database posting mode and "photographs" the Frank Robinson card with digital camera 12. As above, the user fills in the system generated display prompt for information concerning the Frank Robinson card. The resident informs the user of the reserve or offer price and signs or agrees to a consignment contract with the consignment node user to accept the consignment terms to pay the consignment node user on the sale of the card, for example 6%, of sales price as a consignment fee. Again, the system may print the appropriate bar code for the Frank Robinson card. The consignment node user then takes possession of the card and may affix the bar code label to an appropriate cardholder. It should be noted by the consignment node user may again "add value" to his consignment node by entering subjective criteria in the database entry for authenticity, condition, special attributes and the like. The participant or local resident may now electronically present his Frank Robinson card to any consignment node, consignment node auction or consignment node market maker in the consignment node network.

These processes may be repeated again and again to establish a substantial database of goods for sale. It should be noted that the consignment node user may at his discretion take postings from reputable dealers or collectors via a facsimile machine or other forms of electronic or verbal presentment of a good for sale. It is within the sound discretion of an individual consignment node user to establish these practices. It is within the scope of the invention, however, to take electronic postings from other consignment node users or individuals over the network, as discussed below. Each consignment node user may be a franchisee of a central franchiser and the franchiser may police the network to give quality control, detect fraud and revoke the franchises or licenses of poor quality consignment node users. Thus, the consignment node is a "trusted" network for consignment node users providing value to the network by imposing a quality and performance structure on the consignment nodes. The same franchise enforcement scheme is also available to the low cost posting terminal embodiment to the present invention.

The Sale

A buyer, hereinafter participant, may electronically log onto a consignment node via a network connection by use of a PC with participant interface software, through an interactive television application, workstation, internet browser or the like. The network connection drivers for the consignment node are discussed in detail below. The participant may enter the browse node and peruse the consignment node database of goods. It is understood that the participant may receive the image taken with a digital camera 12 of the goods at the participant terminal. The participant, upon finding for example the above-posted Frank Robinson card may decide to purchase the card. The participant may present electronic payment to the consignment node by entering a credit card number and expiration date or other forms of electronic payment. It is understood that a secure and/or encrypted means may be established between a participant's interface application and a consignment node to transfer sensitive or theft prone information. Moreover, a participant may establish an account with his local consignment node to be debited and credited with the funds used and generated with his transactions.

The consignment node may, for example, clear the transaction by charging the participant's charge card account and crediting the consignment node store account by well-known credit card clearing techniques. After the consignment node has cleared the transaction the system electronically transfers ownership of the Frank Robinson card to the participant. The participant may then be presented with the choice of directing the delivery of the Frank Robinson card to a desired location or may choose to post a new reserve or offer price for the card and direct the card to remain in the possession of the consignment node user. Thus, the consignment node allows a participant to speculate on the price of the Frank Robinson card and establishes an electronic market for the Frank Robinson card. It is understood that the consignment node may have many Frank Robinson cards available, thus by the interaction of collectors electronically buying and selling the collectibles it will establish a market price for a Frank Robinson card or any other good. For each transaction, the consignment node user extracts the small consignment fee, e.g., 6% of the sales price, thus the consignment node user directly benefits from operating a reputable consignment node. If the participant elects to take delivery of the purchased goods then the consignment node may track the delivery and ownership of this good to this particular participant in a data record. This data record may be useful to speed the posting of the good, should the participant later decide to re-post and sell the good, and it also creates a valuable database of records to track the possession and ownership of a collectable. This feature may be useful in the agent mode, e.g., tracking down very hard to find items, discussed more fully below.

The Auction

For a rare good, a good in a volatile market, or a good's initial posting the consignment node user or participant may wish to auction the good, with or without reserve, to the highest bidder. In this mode, the good may be posted on the consignment node by the means described above but the data record representing the good is identified as waiting for an auction date and may not be purchased on the electronic market. Alternatively, an item may be in the electronic market of the consignment node with a high reserve price that may be lowered in the auction or liquidation mode. Here the consignment node user or the good's participant owner may enter a protected data field a confidential reserve price for the auction mode. The consignment node user arranges by invoking the appropriate consignment node program a time and date for an electronic auction. The consignment node user or good's participant owner may establish, in a data record that represents the good, a desire for the item to be auctioned. For example, a pawnshop operator of a consignment node may have several Rolex watches he wishes to auction with reserve this Saturday night at 7:00 p.m. The consignment node user, here a pawnshop, identifies on the Rolex watch records the auction date and the confidential reserve price. The consignment node system may "advertise" auction dates, items and auction terms in the consignment node log on welcome message discussed below. Moreover, a good that is identified as awaiting an auction date may be viewed before auction in the consignment node browse mode by a perspective auction participant.

At the auction date, perspective participants log onto the consignment node auction mode locally or through the consignment node network and await the first good to be auctioned. It is understood that in the best mode of the invention the participant will have a data terminal with a digital to analog converter such as a "sound blaster" and speaker, the digital to analog capability may be used in the auction mode to bring the aural excitement of an auction, e.g., the call of the heckler, the caller and bidders, home to the auction participant. This is discussed in more detail below.

The consignment node takes the first item to be auctioned and posts the image of the good and the good's text record to the participants. The consignment node then posts the opening bid. It is understood that the bid postings may be in a protocol that invokes the. generation of an auctioneer's voice at the participant terminals. The participants may then respond with a higher bid. The consignment node mode scans electronically the participants for bids and accepts the highest bid. If bids are tied the consignment node may take the first highest bid by the participants log on order. A particular bidding participant receives a special acknowledgment from the consignment node that her bid was accepted. The consignment node then posts the higher bid to all the electronic auction participants. The consignment node repeats this process until no higher bid is received for a predetermined amount of time and closes the auctioning of that particular good. The consignment node then checks whether the highest bid received is greater than the reserve price, if appropriate. The consignment node may then post sold! and the sell price to all participant terminals and proceed to post the next item for auction. Again a successful purchaser may elect to direct delivery of the good or post the good on the electronic market at a new participant determined offer price.

It is understood that the terms of the auction sale are posted and agreed to by the participants before allowing a participant to bid on goods in compliance with local requirements and statutes. It is also understood that a participant may make electronic payment for the goods or establish a line of credit or collect on delivery terms within a particular consignment node user's discretion. This may be established by a relationship between a local consignment node user and a local participant at the local consignment node user's discretion.

It should be noted that a consignment node user may sell virtual advertising space or a central master node e.g., the franchiser, may coordinate the sale of advertising space on a pool of consignment nodes to reach target market participants. For example, if a participant has purchased or speculated in antique pens, and advertisers of an antique pen specially consignment node wishes to target market individuals on the network who have purchased collectable pens in the past. A central coordinated master node may sell advertising to an advertiser for the log on message or e-mail targeted participants and users. Thus, the network of consignment nodes can establish a market for target marketing or blanketed advertising of goods and services sold locally or on a network level by a central node.

The Agent

The Agent Mode allows a consignment node participant to search a plurality of consignment nodes and purchase records for a used good. A participant may log onto his local consignment node to shop. This participant, for example, may be interested in purchasing a particular used coin for her collection. The participant may invoke a consignment node Agent to search the network of consignment nodes for this coin. The participant fills in the search parameters for this coin, for example, a 1872 U.S. penny from the Denver Mint. The consignment node Agent task handler verifies the Agent form is sufficiently filled out and accepts the task. The Agent checks a list of other consignment nodes network addresses kept by the local consignment node database and generates an Agent communication message to each consignment node on the list and begins to establish communications to the other consignment nodes. An Agent message between consignment nodes begins by coordinating or reconciling the database on each consignment node of the locations and/or address of other consignment nodes. If a consignment node has a different list of consignment nodes in its database it will pass the node update information to the other consignment node. The consignment node originating the Agent task will generate a new Agent task to accommodate the information concerning the new consignment node. Once the consignment node database of consignment nodes is reconciled, the Agent will search the consignment node database for the goods requested. The Agent will report back whether the search of the local market database was successful and how many good that matches the Agent search request it found. An Agent may also search the consignment node database of past transactions to identify an owner of a particular good. The Agent may then report that John Doe of Main Street, U.S.A. was the last known purchaser of a 1872 U.S. penny from the Denver Mint at this node. It is understood that differing levels of privacy are available to consignment node purchasers, so as only allowing the local consignment node user to view past purchaser information and/or provide the Agent with an option of contacting that consignment user so he may contact the prior purchaser, thus, protecting privacy while allowing bona fide offers to reach the prior purchaser in confidence.

Once some of the Agents start reporting back to the Agent originating consignment node, the originating consignment node may report the results to the consignment node participant of the Agents' results. Such results may give the total number of matching items found thus providing the local participant/collector an indication of the depth of this market. It is understood that a local consignment node user may charge participants for Agent requests.

Computer Implementation

In the preferred embodiment of the present invention a consignment node may use a multitasking operating system such as UNIX, OS/2, NT or VMS. However, a Microsoft DOS or Windows implementation is within the scope of the present invention. The consignment node may be networked via TCP/IP and the internet or a private TCP/IP network or X.25 private or public network or service providers network of ISDN, ATM and the like. It is understood, that a consignment node may support a plurality of protocols simultaneously. Moreover, it is understood that the participant interface application program may execute on a wide variety of platforms such as PC's, MAC's, Power PC's, workstations, cable set-top boxes, video game hardware and the like and are within the scope of the present invention. The posting terminal embodiment is discussed in detail below.

BRIEF DESCRIPTION OF THE DRAWINGS

FIG. 13 is a diagram showing a user interface on a posting terminal or consignment node.

DETAILED DESCRIPTION OF THE PREFERRED EMBODIMENTS

Figure 1:
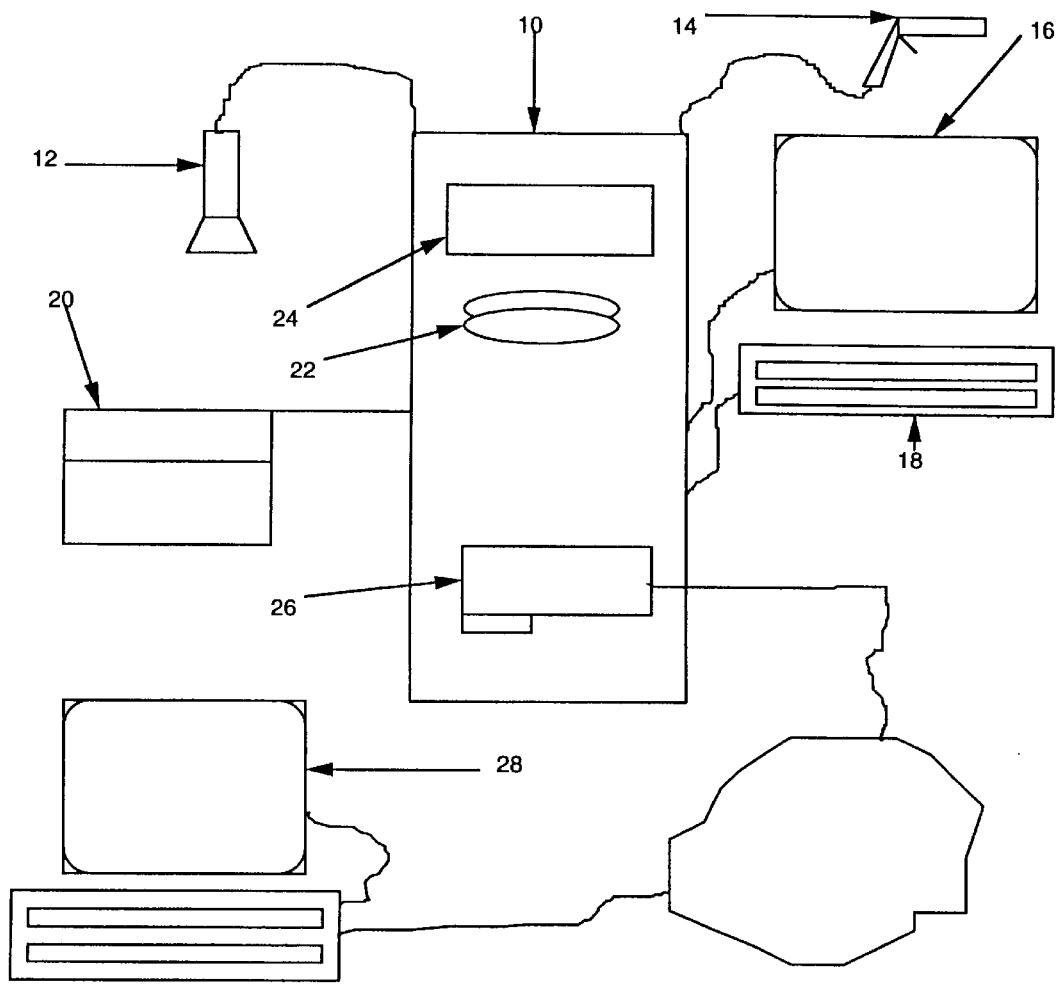
FIG. 1 shows the consignment node of the present invention may have a computer 10, a data storage device 22, a tape drive 24, a digital camera 12, a bar code scanner 14, a display 16, a keyboard 18, a laser printer 20, and a network connection 26. A participant user terminal is shown at 28.

It is understood that the get session identification procedure 100 is a routine that monitors the communication ports and virtual communication ports residing on a protocol stack. The consignment node may use, for example, a X.25 interface card, available from Eicon Corporation or Frontier Corporation to execute an X.25 protocol stack in a PC workstation. The get session identification 100 program may monitor the X.25 protocol for incoming calls. If the program identifies an incoming call it may answer the call by transmitting the appropriate X.25 packet to the network on the appropriate virtual channel. It is understood that other protocols, such as TCP/IP, DECNET, SNA and ATM are within the scope of the present invention and that multiple protocol stacks may simultaneously execute in a consignment node. Therefore, the get session identification program 100 may have multiple instances to connect and monitor the various protocols. After the get session identification 100 has appropriately answered an incoming call to the consignment node, it may invoke the display welcome message and menu routine 102.

It is understood that the get session identification 100 provides sufficient information to the display welcome message and menu 102 to allow the display welcome message and menu 102 to connect to the appropriate session or virtual channel. At this juncture, if the participant is using an approved interface program, the interface program will send a predetermined code to indicate its version and other characteristics of its display driver. If a participant is logging in from a TTY terminal or other terminal the display welcome message and menu 102 may detect this information and send the appropriate TTY welcome message. This procedure may also be used to identify features and languages supported on various internet world wide web browsers. It is understood that the welcome message is viewed by the consignment node user as virtual advertising space that may be sold by the consignment node user or coordinated with the master control node (discussed in detail below). The participant may respond to the display welcome message and menu 102 program by giving an appropriate log on response 104. The get log on response 104 may verify and grant a level of access privileges to the participant. It is understood that the consignment node user may require the get log in response 104 to retrieve a credit card number, pin number, user ID and the like, to grant access privileges. If a participant is using a TTY terminal those sessions may be shunted to the download interface program (DIP) 106 routine to receive an appropriate interface program from the consignment node. The DIP 106 may present a list of choices as to what version interface program should be downloaded, such as DOS, Windows, UNIX, MAC platforms and what transfer program is desired such as Kermit, Xmodem, FTP and the like. A participant with a participant interface program may also elect to receive a new interface program from the DIP 106. It is understood that an older, no longer supported interface program participant may be shunted to the DIP 106 to receive a new interface program.

A participant with a supported interface program may select the auction 108, market 110 or agent handler 112 sections of the consignment node. If a participant selects auction 108 the participant may be presented with a menu of auction selections such as auctions in session, future auction times, dates, locations and topics, and auction preview. If a participant selects auctions in session the participants' session is passed to the appropriate auction handler, as discussed below. If a participant selects future auctions the participant will be given a list of future auction times, dates, terms, locations and topics of auctions on this and other consignment nodes. It is understood that these displays represent a virtual advertising opportunity for the consignment node user and the advertising space may be sold by the consignment node user or by the master control node. If the participant selects the auction preview, the auction process 108 passes the participant session to the market session 110 with data that indicates an auction preview desired by the user.

If the participant selects the market 110 choice the participant is given a menu of markets that the participants may browse, discussed further below. If the participant selects the agent handler 112 the participant may be provided with an electronic form to create a search for a good. The participant may then execute this Agent's search request to search the network of consignment nodes databases to look for the desired goods. The Agent is discussed more fully below. The Agent Handler 112 also receives incoming calls from other agents to process the external agents search request on the consignment node. The participant interface and consignment node participant functions are discussed in detail below. It is understood that the agent may also function between virtual markets on a market maker computer and with the transaction archive database discussed below. The discussion now turns to the operation of the consignment node by the user.

Figure 3:
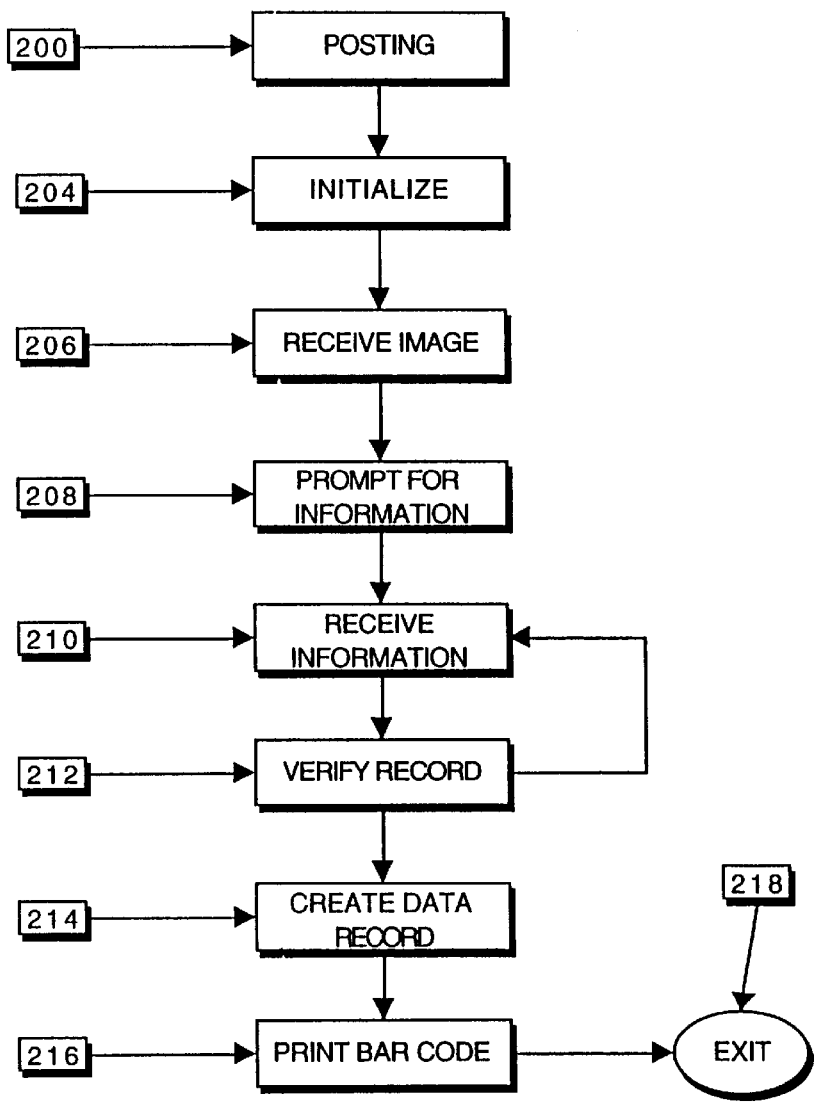
FIG. 3 is a schematic diagram showing the logical flow of the consignment node auction process.

FIG. 3 shows a logical flow diagram of the steps the consignment node may use to create a database record of a good for sale or for auction.

The consignment node user may invoke the consignment node program to enter the posting 200 mode to create a data record for the good. The posting 200 mode initializes 204 the consignment node to receive information on a new good. The initialization 204 step displays a data record with data fields on the consignment node terminal for the user to fill in information on the good. The initialization step 204 also initializes the consignment node peripheral devices such as the digital camera 12 and the printer 20. The consignment node user then "photographs" or digitizes the image of the good from one or more perspectives as well known to the digital camera arts. The consignment node receives the digitized image(s) at receive image 206 step. The consignment node program then prompts the consignment node user for information on the good 208. The consignment node receives information 210 that the consignment node user inputs to the data record displayed at step 208. The consignment node program verifies 212 that the necessary information, such as owners name, reserve price, market or auction designation is in the data record. The verify step 212 will reject the record and return the consignment node user data entry mode 210 if the record does not have the minimum information. If the record is verified 212 as complete enough to commit to the consignment node database, a data record is created 214 and linked into the consignment node database. The consignment node program then generates and prints a bar code 216 that indicated the data record. The bar code system is used by the consignment node to maintain an accurate inventory and is a hook for local sales (discussed below). The posting routine may then exit 218 and return from the posting program. By repeating the posting routine of FIG. 3 the consignment node user may build a database of goods for the consignment node market, auction and/or agent searches.

Figure 4:
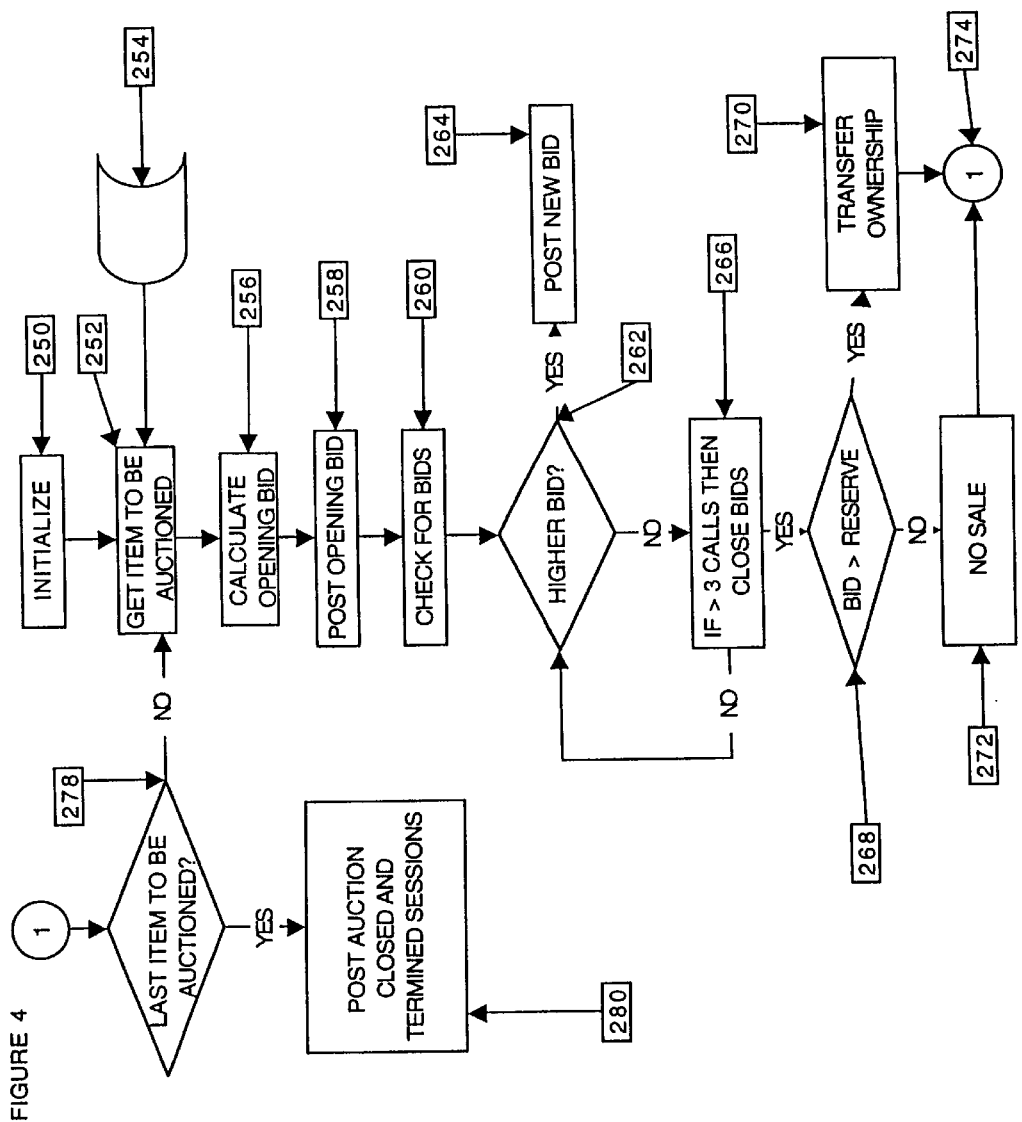
FIG. 4 is a schematic diagram showing the logical flow of the consignment node market or browse mode.

FIG. 4 shows the logical block flow diagram of the processes the consignment node may take to execute an auction. It is understood that the consignment node user may manually invoke the auction process, or may schedule the consignment node to execute the auction process. The auction process begins by initializing 250 the data structures, records, queues and the like to conduct the auction process. The connection between the auction process and auction participants is discussed below. The auction process gets the first item to be auctioned 252 from the database of goods to be auctioned 254. The consignment node then calculates the opening bid 256 by a predetermined formula such as 50% of the reserve or general solicitation of an opening bid is posted to the auction participants 258. The consignment node auction mode then scans the participants for a higher bids 262. If a higher bid is found the new bid is posted 264. It is understood that the steps of checking for bids 260 determines if the bid is higher 262 and posting the new higher bid 264 is repeated until no higher bids are received. After the typical auction closing of going once . . . twice . . . three times the auction is closed 266. The consignment node auction program then compares the highest bid received with the good's reserve price 268 to determine whether to transact the sale. If the highest bid is greater than the reserve price the consignment node auction process posts sold! for xxx amount to the auction participants and calls the transfer ownership subroutine 270, discussed further below, and transfers the ownership of the good. If the highest bid is less than the reserve price the consignment node auction process announces no sale! 272 to the auction participants. The auction process then proceeds 274 to get the next good to be auctioned 278. The consignment node auction process is then repeated until all the goods to be auctioned have been run through 278. The consignment node auction may then close and terminate the participant sessions 280. It is understood that the transfer ownership 270 sub-routine may require time to clear the transaction and, therefore, may be best implement as a spawned child process to the auction process. This will keep the consignment node auction executing at an exciting and fast pace for the participants. The consignment node auction process itself may execute in several instances to provide simultaneous auctions on a consignment node. Thus a consignment node may conduct several simultaneous auctions on several virtual runways. It is understood that in the auction mode the consignment node and the participant interface software may communicate using a protocol that allows the consignment node auction driver to "point to" locations stored in the participant interface software, to cause the participant interface software to generate the sound of a auctioneers voice on the sound blaster, or equivalent board. Thus, the present invention uses pre-stored sound samples of different auction prices and auctioneer "string" along aural calls inside the participant interface software, and allows the generation of said pre-stored sound bites to be invoked by the consignment node driver through the said special protocol. This method greatly reduces the bandwidth necessary for a consignment node to support the generation of exciting auctioneers calls at a plurality of participant terminals. It is understood that the generation of an audio bit stream from the consignment node to the participant terminals is also with the scope of the present invention.

Figure 5:
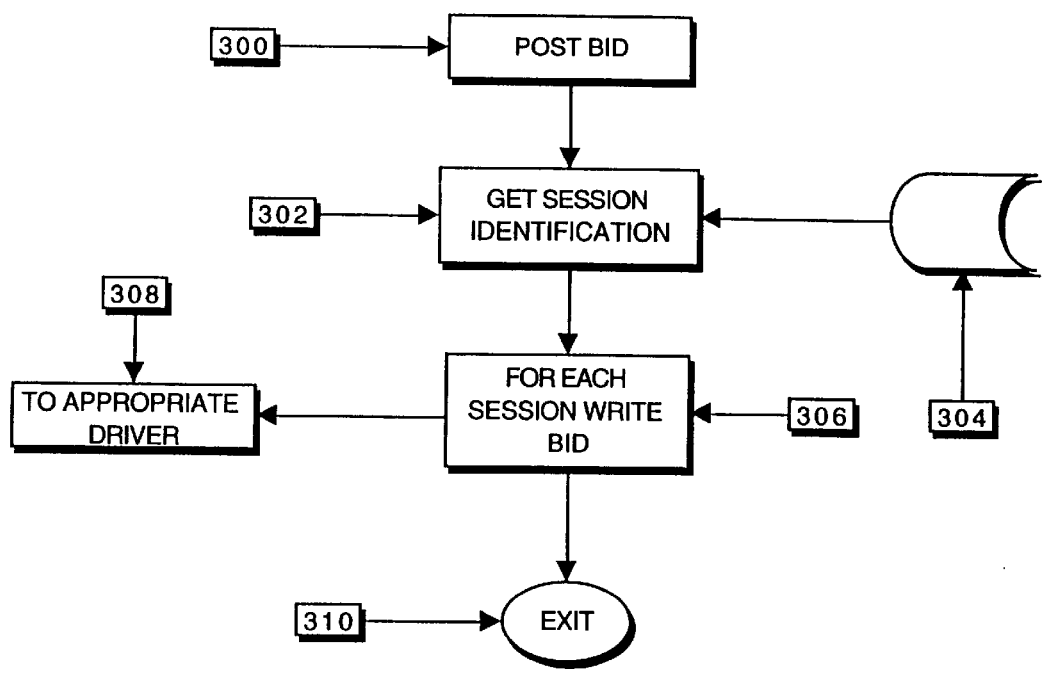
FIG. 5 is a schematic block diagram showing the logical flow for posting a new used good on the consignment node.

FIG. 5 shows the logical flow for the post bid subroutine 300. The post bid sub-routine may be invoked from several consignment node processes, those specifically described thus far are the post opening bid 258 and posting bid 264 logical processes. The post bid 300 sub-routine is used to communicate between a consignment node and multiple participants. The post bid 300 sub-routine gets participant session identifications 302 from a data record or data structure that contains a list of session identifications of participants who have logged onto the auction sessions. The next step sends the bid passed to the post bid 300 subroutine to each participant session identified in the data structure 306. Bids are posted to each participant through an appropriate driver 308. The driver may be identified for each particular user session. For example, a PC user logged into the consignment node via an X.25 virtual channel may require a host PAD driver in the consignment node to communicate asynchronously to the PC terminal interface application. A network user may require a TCP/IP driver to connect between the consignment node and the participant networked terminal. After communicating the bid to participants through the appropriate device driver 308, the post bid sub-routine may exit and return 310 to the calling routine.

Figure 2:
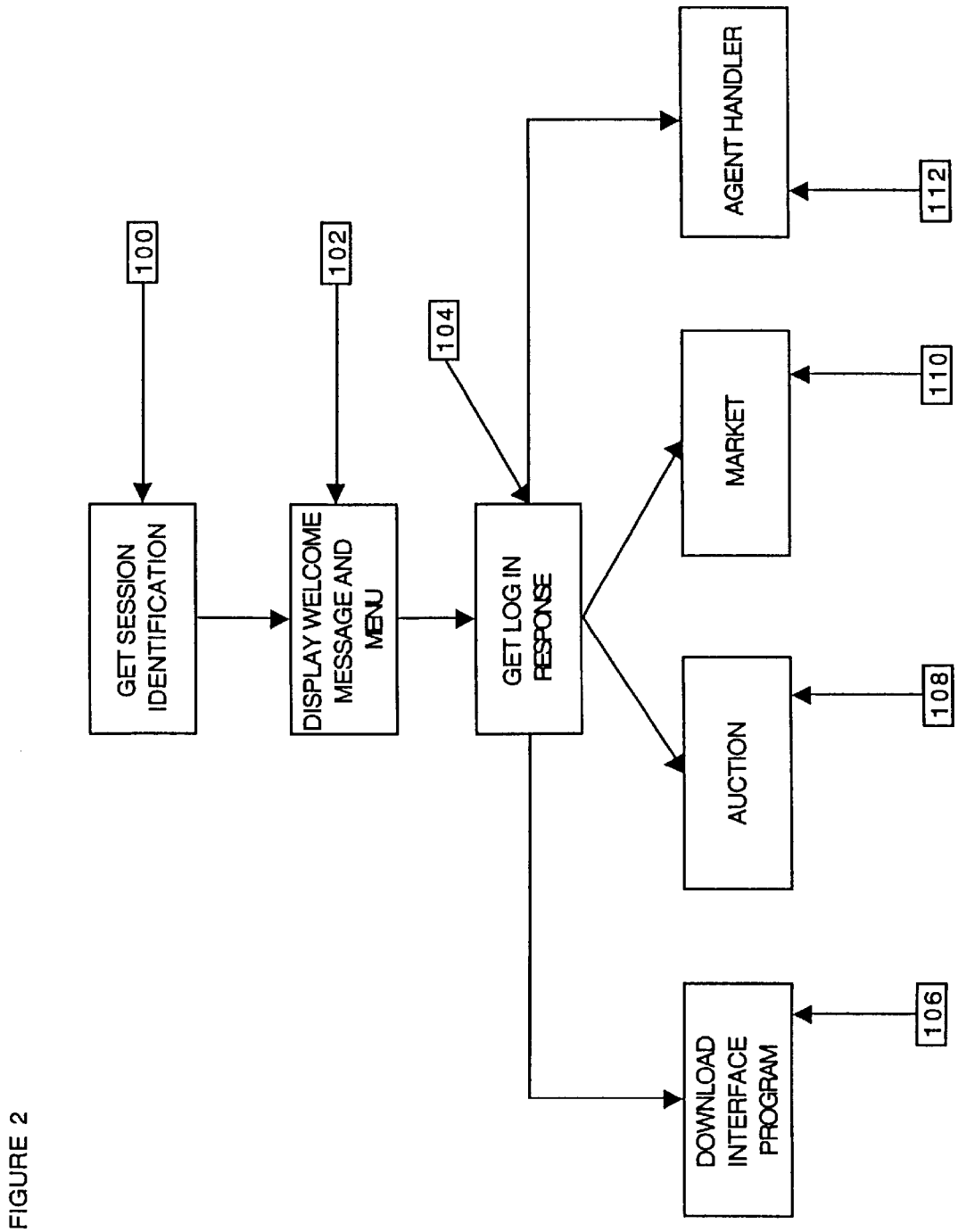
FIG. 2 shows a schematic block diagram showing the logic flow of a user log in at a consignment node.
Figure 6:
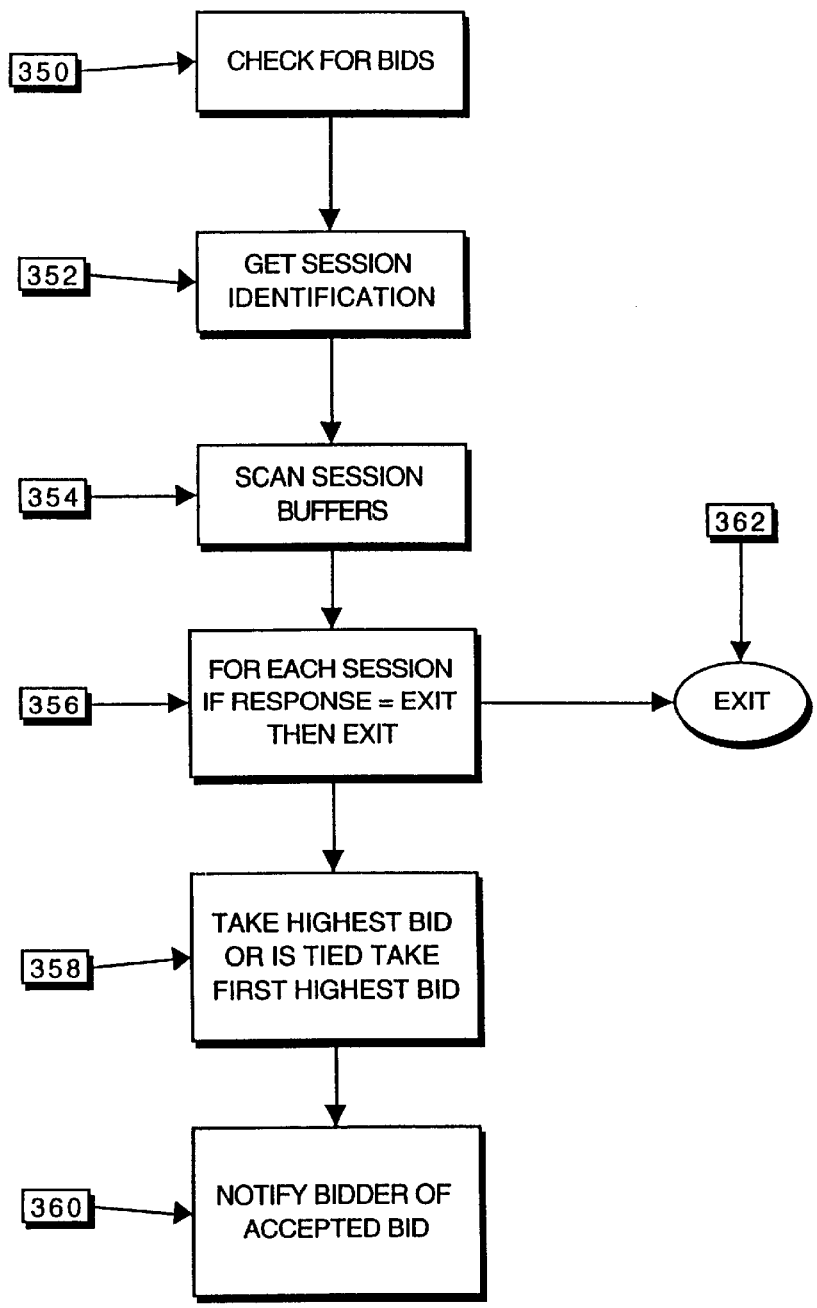
FIG. 6 is a schematic diagram of a subroutine that may be used to post auction bids.

FIG. 6 shows the consignment node subroutine to check participant sessions for bids during the auction mode. Check for bids 350 maybe a subroutine called by the auction program to scan for bids. It is understood that when a participant logs into the consignment node and selects the auction mode, (see FIG. 2), the participant's session identification is passed to a data structure. The data structure maybe used by the check for bids 350 sub-routine to correctly identify participants at a particular virtual auction. As noted above, the consignment node may support multiple simultaneous auctions, therefore, may require multiple instances of the aforesaid data structure. The check for bids sub-routine 350 opens or connects to the appropriate data structure storing or holding participant session identifications who are participating in the check for bids calling auction program instance at the get session identification step 352. The buffers associated with each session is scanned for an input 354. If a participant has input an "exit" command or symbol 356 the routine removes that participant's session identification from the auction identifying data structure and allows the participant to exit 362 the auction. The participant's session identification may be returned to a data structure that allows the participant to return to the consignment nodes main menu, see FIG. 2, or terminate the participant session. The subroutine then compares the bids and takes the highest bid 358. If bids are tied for the highest bid the sub-routine may use the first received bid and reject the others 358. The sub-routine then notifies the participant session who had the highest bid 360. It is understood that the take the highest bid step 358 and notify bidder step 360 are aware of the current bid price for a good and will not allow a lower bid to be accepted. It is understood that the participant session buffers are flushed after they are scanned to remove old or latent bids. The check for bids sub-routine then returns to its calling routine.

Figure 7:
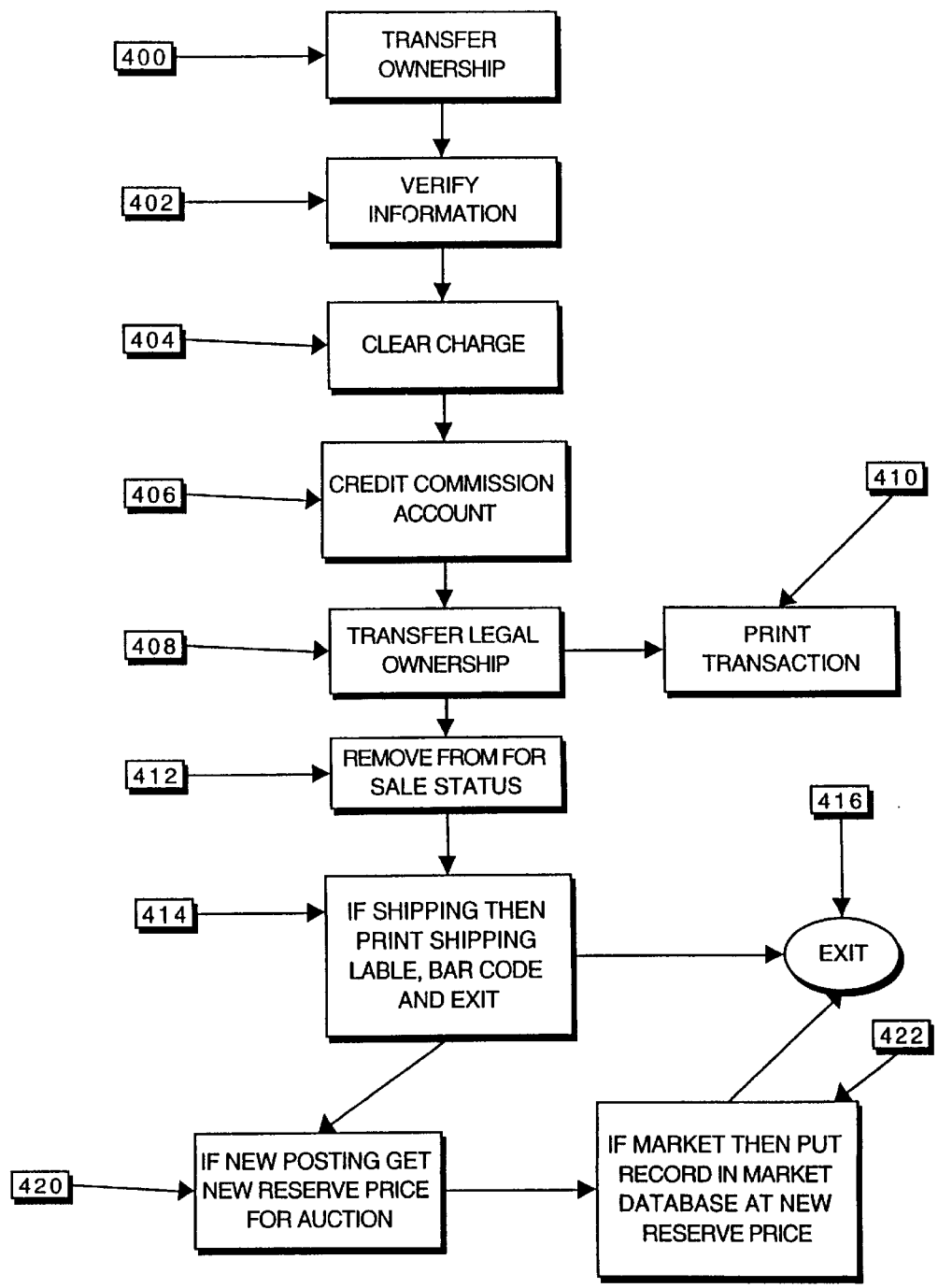
FIG. 7 is a schematic diagram of a subroutine that may be used by the consignment node auction process to receive participant auction bids.

FIG. 7 shows the transfer ownership routine 400 that may be used to transfer the ownership of goods and collectibles in the consignment node. The transfer ownership sub-routine may be called from several consignment node modes and processes to effect the transfer of legal ownership. The first step in the transfer ownership sub-routine 400 may be to verify a participant purchaser information 402. It is understood that the consignment node may use a variety of well known authenticating procedures to verify a participant, such verification techniques include personal identification numbers (PINS), passwords, call back, and a plethora of encryption techniques and personal information identification means to provide a reliable verification technique. It is understood that a consignment node user may have established a credit or deposit account for the participant from past sales or the transfer of funds and the verify step 402 may connect the participant to the account. The clear charge 404 step is used to clear the participant consignment node transaction. It is understood that this may be via an external credit card clearing network, a connection to a credit account, or though one of the many proposed electronic fund transfer schemes such as debit cards, money, and clearinghouses. After the transaction clears the charge 404, the consignment node credits the consignment node users commission account 406 to extract the consignment node transaction fee. The consignment node then transfers legal ownership 408 of the good by changing the ownership entry in the data record in the consignment node of the good. The consignment node may then print a record of the transaction 410. It is understood that step 410 may also be used to keep a log on the consignment node storage or tape drive. The consignment node then removes the good from sale or auction status 412. It is understood that the data record representing the good is "locked" during the transfer ownership sub-routine to prevent collisions of actions and transfers of the good. If the participant has elected to ship goods then the consignment node will print a shipping label 404 for the consignment node user to attach to the good for shipment. The transfer ownership routine may then exit 416. If the participant has elected to re-post the good or collectable the participant may specify a new reserve or offer price for the good or collectable. It is understood that the purchasing participant may elect to leave the good or collectable at the consignment node and post a new offer or reserve price and may identify that the good is on the market, e.g. may be bought and sold at any time, or that the good is awaiting an auction date. Moreover, the participant may elect to have the good viewable on the market or "invisible" to the market while awaiting an auction date 422. It is understood that the participant may elect to leave the good at the purchased consignment node and electronically transfer the offering of a good to another consignment node. It is understood that consignment node users may run a "trusted" network between consignment nodes to provide the trust between merchants, that the goods exists and that the network between the consignment nodes to provide for electronic presentment of a good is a secure network connection. This allows collectable goods to be concentrated for a single electronic auction or virtual collectable market on a market maker consignment node without incurring the costs of shipping the goods to a central location to bring the good to the market maker consignment node. It is understood that the trusted posting of goods on a market maker node is a value added feature a small town consignment node user can provide to his immediate collector community. It is understood that the master central node may also serve as a legal consignment node franchising authority to provide enforcement of integrity, security and quality control for the consignment node network.

Figure 8:
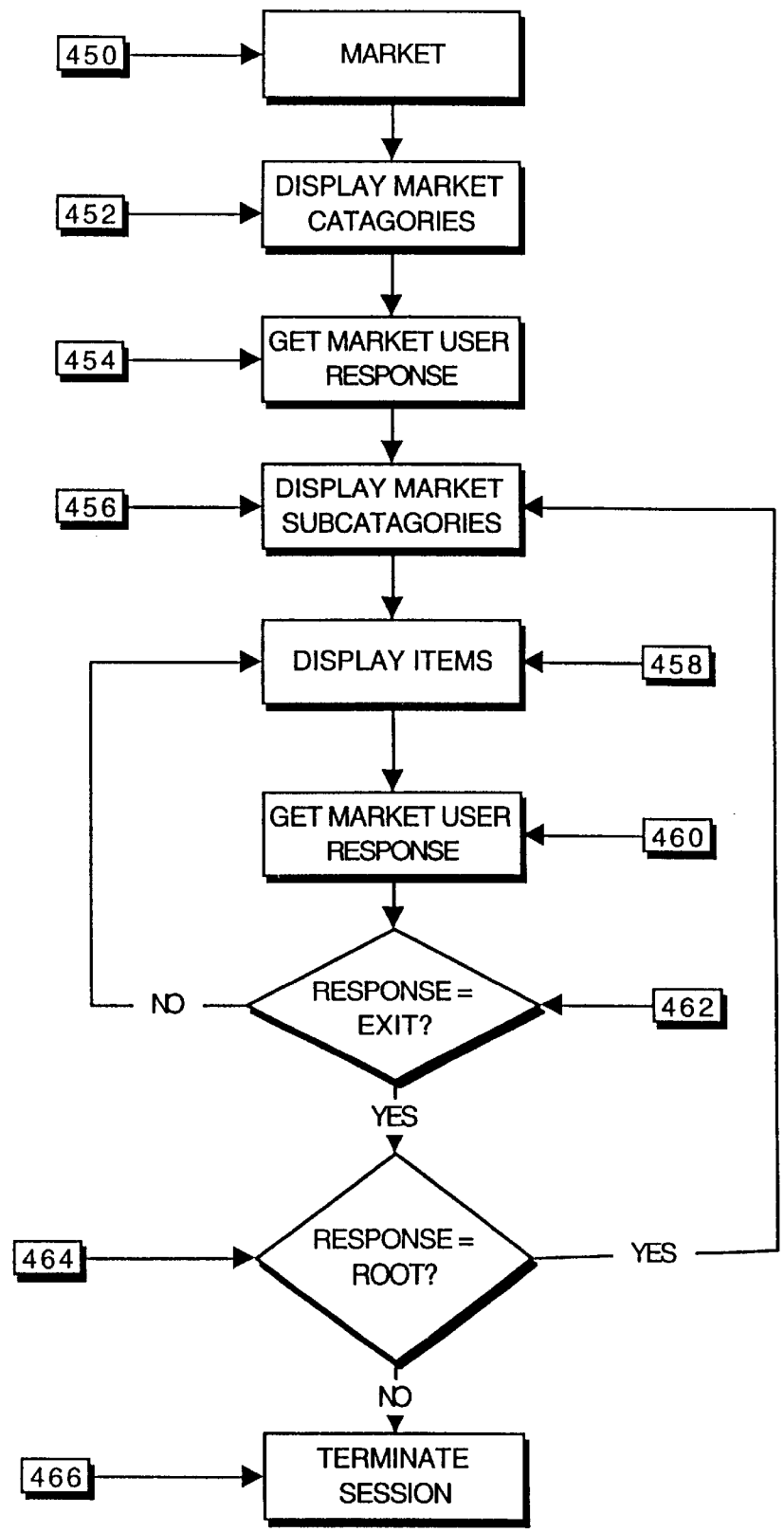
FIG. 8 is a schematic diagram showing the logical flow for a subroutine that may be used to transfer ownership of an item.

FIG. 8 shows the consignment node routine that may be used to establish a virtual market. The market 450 may be selected from the consignment node main menu, see FIG. 2, to allow a participant to browse the consignment node goods database. The market 450 will display to the participant market categories 452, categories may be defined by the consignment node user to reflect the specialization of his consignment node and the specialized markets or miscellaneous markets for his goods. The consignment node then gets the participants response 454 to the market choices. The consignment node may then display market sub-categories 456. Again, the consignment node user may specify market sub-categories to reflect the specialization of the consignment node. The consignment node may then display items 458 and get the participant or market user response 460 to the displayed choices. It is understood that the participant may browse or scroll through the goods on the market 462, 458, 460 until the participant responds with a desire to exit the market 463. If the response is a desire to transfer to the market root directory 464 then the consignment node will return the participant to the market subcategories 456. If the participant responded with a desire to terminate the session 466 the consignment node will exit the market and terminate the participant's session. It is understood that during the browse loop 458, 460, 462 a participant may elect to buy or make an offer on a good and may invoke the transfer ownership routine, see FIG. 7, to effect the transfer of a good's ownership. It is also understood that a participant may make an offer on a good below the asking (or offered) price. Such a proposed offer may be stored by the consignment node and used to notify the good owner. The good owner may then accept the counter offer or reject. It is understood that a participant counter-offer may be made subject to an acceptance before date. It is also understood that a participant may establish a "buy at" or "sell at" price/quantity for any good in the market.

Figure 9:
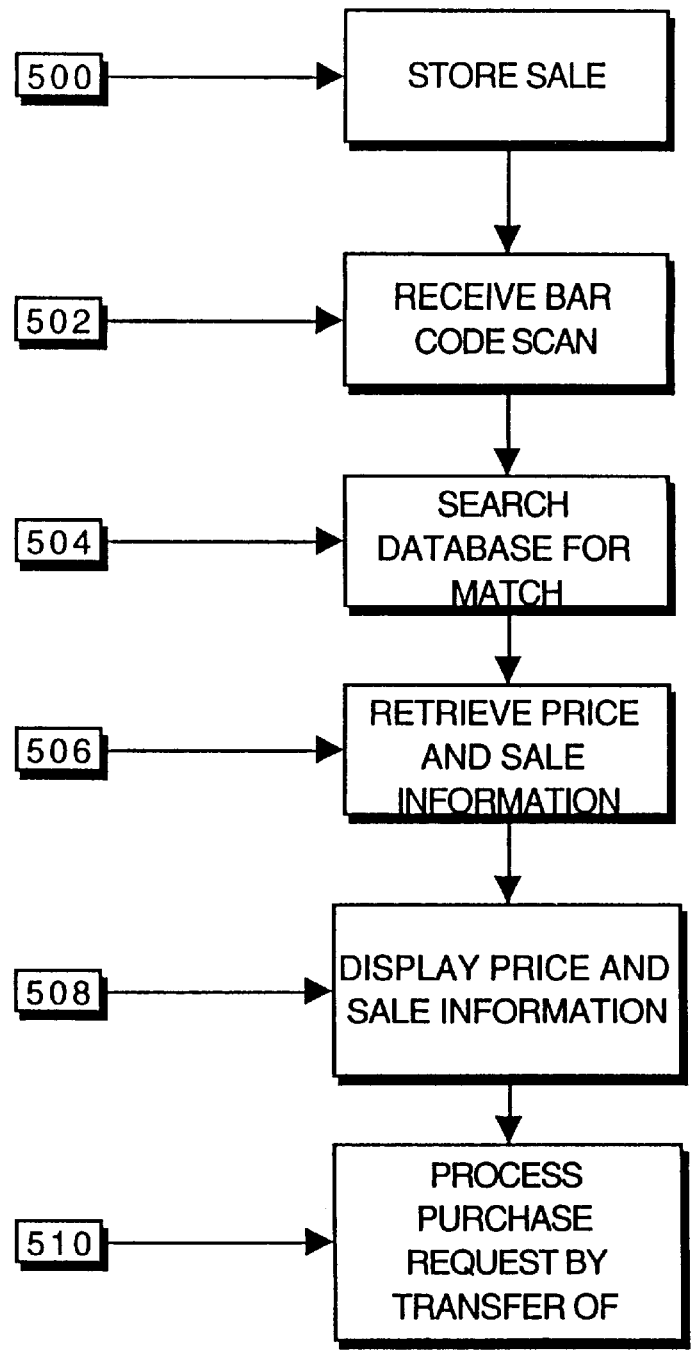
FIG. 9 is a schematic diagram showing the logical flow for a consignment node in-store sale of a good.

FIG. 9 shows a logical flow diagram of the process that may be use to transact the transfer of ownership of goods on a consignment node at the store where a consignment node may be located. The consignment node user invokes the store sale sub-routine 500 from a consignment node user terminal, see FIG. 1. The consignment node user may use the bar code scanner to scan the bar code of the good for sale 502. It is understood that the consignment node user may manually recall or search the consignment node database for the data record of the good or may let the consignment node software use the bar code to automatically retrieve the record 504. The data record is then scanned to retrieve price and sale information on the good 506. It is important to note that a good, while on display at a consignment node user's shop may have transferred ownership and changed price via network participants. The consignment node then displays this information 508 at the consignment node user terminal. The store customer may then elect to purchase the good. The consignment node may process a store customer purchase request by calling the appropriate sub-routine to transfer ownership, see FIG. 7, of the good.

Figure 10:
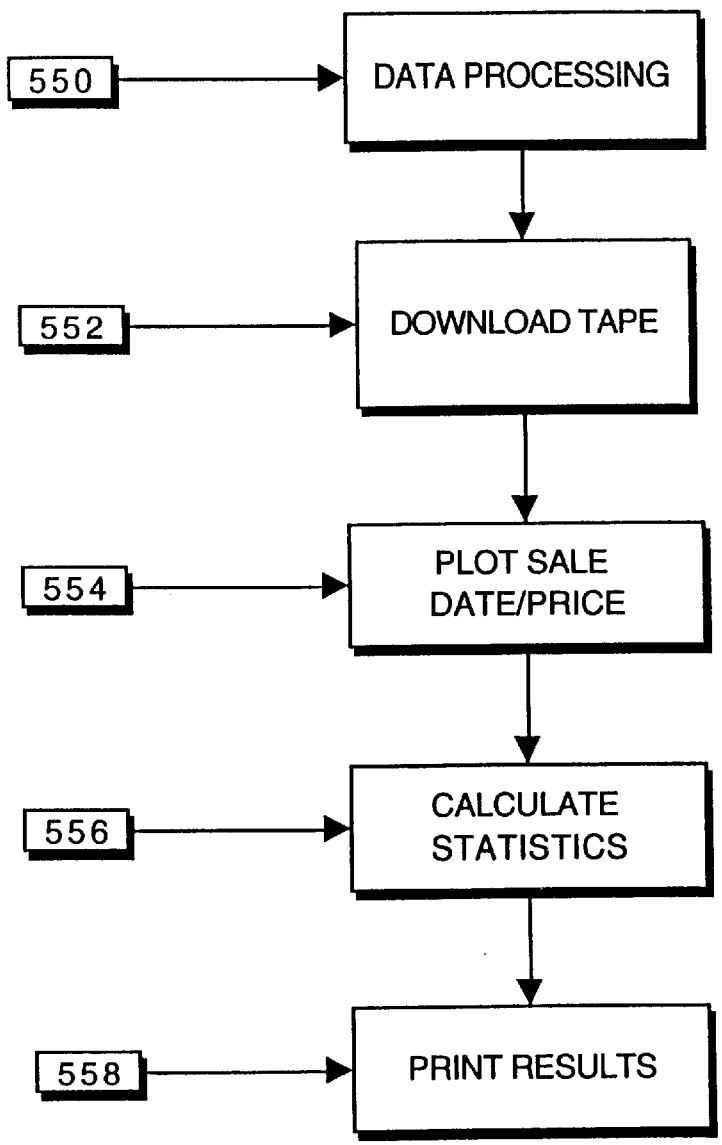
FIG. 10 is a schematic diagram showing the logical flow of post-processing and analyzing consignment node sales.

FIG. 10 shows a logical process diagram for the central node to collect and process data concerning transactions on a plurality of consignment nodes and provide value added feed back to consignment node users on market positions and trends. Data processing 550 may be executed on a consignment node or the central node to extract transaction data from a consignment node. It is understood that the tape drive, or storage device may be used to log network transactions on the posting, auctioning, buying and selling of goods and collectibles on a consignment node. This information may be collected by the central node over the consignment node network. The central node may then plot sales, sale date, price over time and the like to create graphs of market performance 554. It is understood that the data correlation and processing steps 554, 556 may be customized to provide a particular consignment node user with useful market information. The central node may also provide hard copies or electronically transfer the information to the consignment node users. It is understood that this may be a value added feature of a service that may be provided by a franchiser. It is understood that the central node may log into a consignment node, with well known remote processing and data transfer techniques such as the logon and FTP UNIX utilities to make changes to the aforesaid virtual advertising space on a consignment node.

Figure 11:
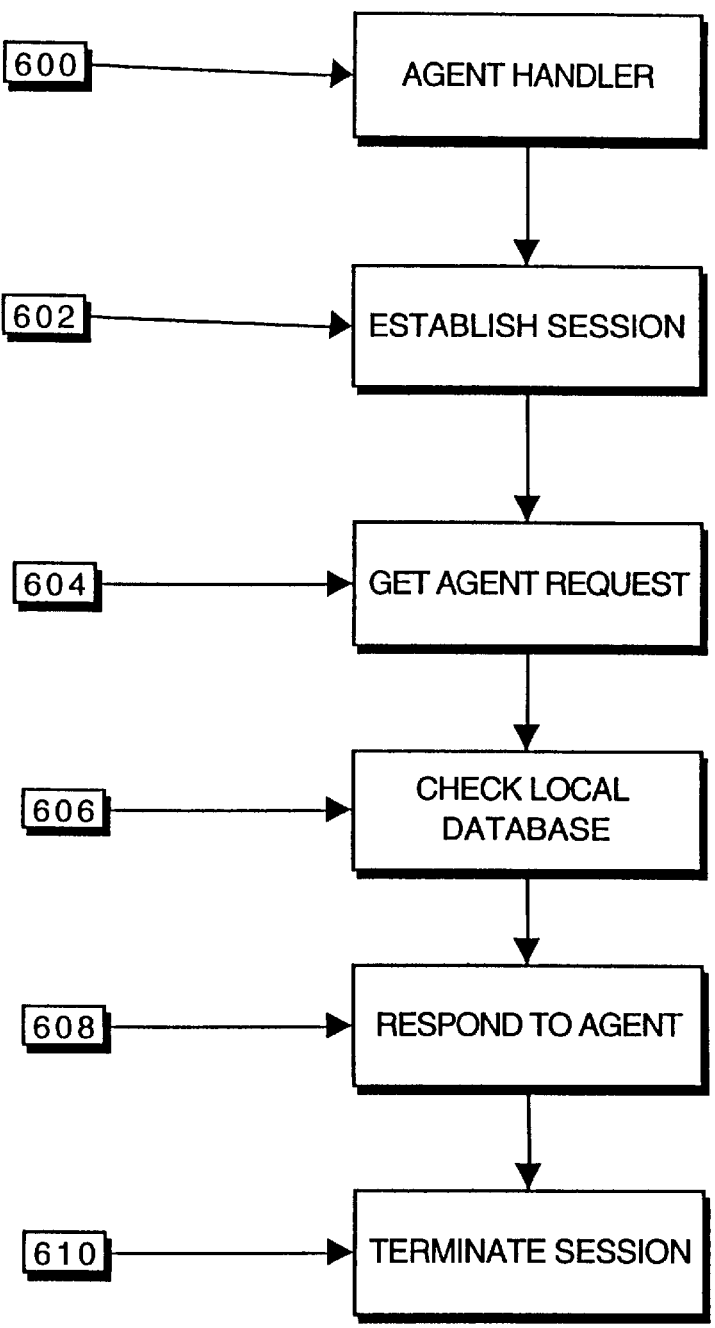
FIG. 11 is a schematic diagram showing the logical flow of the consignment node Agent handler subroutine.

FIG. 11 shows the agent handler the consignment node may use to establish agent-to-agent and consignment node-to-consignment node connections to process participant agent requests. The agent handler 600 may be entered by a predetermined series of codes and verification procedures to verify a request for an agent connection to the consignment node is from a bona fide agent and a bona fide consignment node. Once this is verified the agent handler may establish a session for the requesting agent 602. The requesting agent may then transfer its agents request to the consignment node 604 and the consignment node may then check its local database 606 to try to match the agents search request. The agent handler may then respond to the agents request 608 and terminate the agent session 610.

Figure 12:
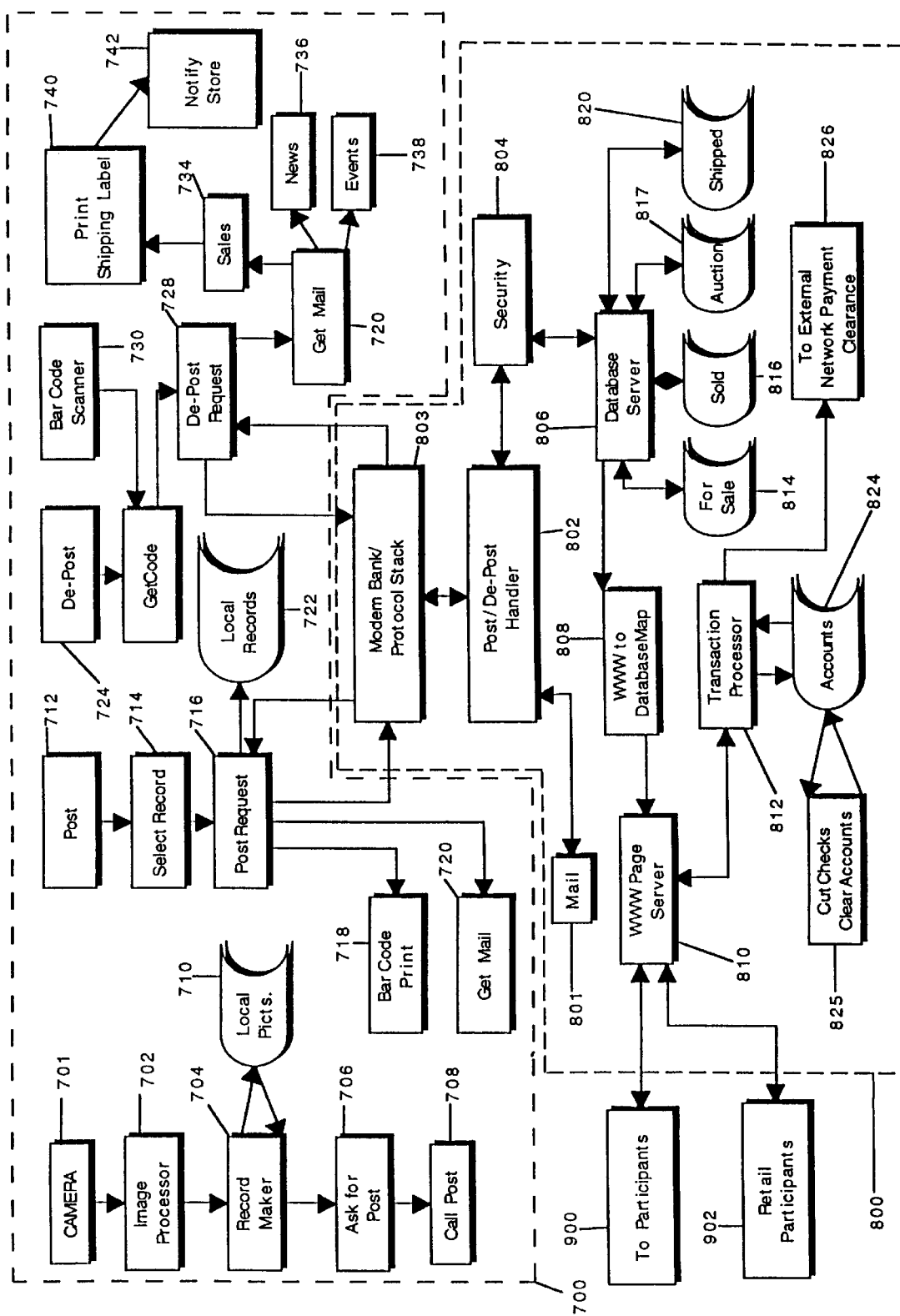
FIG. 12 is a block diagram of the posting terminal to market maker computer connections.

A second embodiment to the present invention, shown in FIG. 12, uses a low cost portable "posting" terminal to allow the virtual presentment of goods to market. The posting terminal has a digital camera, a bar code printer, a bar code scanner, a modem and posting terminal software. The posting terminal works in conjunction with a market maker computer. The market maker computer has a database of goods for sale, a posting/de-posting communication handler, a database to world wide web (www) mapping module, a www server, a transaction process, a posting terminal communication manager, a sold database, a shipping database and an account database and has much of the functionality of the previously described consignment node.

The posting terminal and market maker computer functional block diagram is shown in FIG. 12. The posting terminal has a camera interface 701, and image processing module 702, a record maker module 704, a storage unit 710, for storing images and records that have not been posted, a post module 712, a select records module 714, a post request module 716, a print bar code module 718, a get mail module 720, a storage unit for holding posted records and return codes 722, a de-post module 724, a get code module 726, and de-post request module 728, a bar code scanner interface 730, another instance of the get mail module 720, a mail sales routine 738, a print shipping label routine 740, a notify store routine 740, and a check sales module 734. The posting terminal 700 contacts a market maker computer 800 to check sales, to post goods, to de-post goods and to receive mail. The posting terminal 700 is easier to administrate than a consignment node because it behaves like a retail point-of-sale terminal to manage goods that have been posted and are locally sold. The bar code labeling and scanning routines and methods make it easy for the posting terminal user to maintain an accurate account of what goods have been posted, de-posted, sold and/or shipped. The posting terminal may use an MS-DOS or MS-WINDOWS operating system that is much easier for a small store owner to operate and administer than a complex multi-user system like UNIX or WINDOWS NT.

The posting terminal 700 functionality begins with a user taking a digital picture with the posting terminal digital camera and connecting the digital camera to the camera interface module 701. The user selects an icon on a graphical user interface generated by the posting terminal software to pull the digital pictures from the digital camera. It is understood that other input devices such as scanners and the like may be use in place of the digital camera. The image process module 702 may convert the digital picture to a compressed data format such, as JPEG or MPEG, more suitable for communication of the image across a data link. It is understood that the image may keep it's full resolution for posting. The posting terminal then invokes the record maker routine 704. The record maker routine 704 may display the image or allow the user to select an image from storage unit 710. The record maker may display on a posting terminal display a data entry record with pre-defined text fields, number fields, "buttons," knobs and other graphical user interface objects to allow a user to enter data to complete a posting record.

Figure 13:
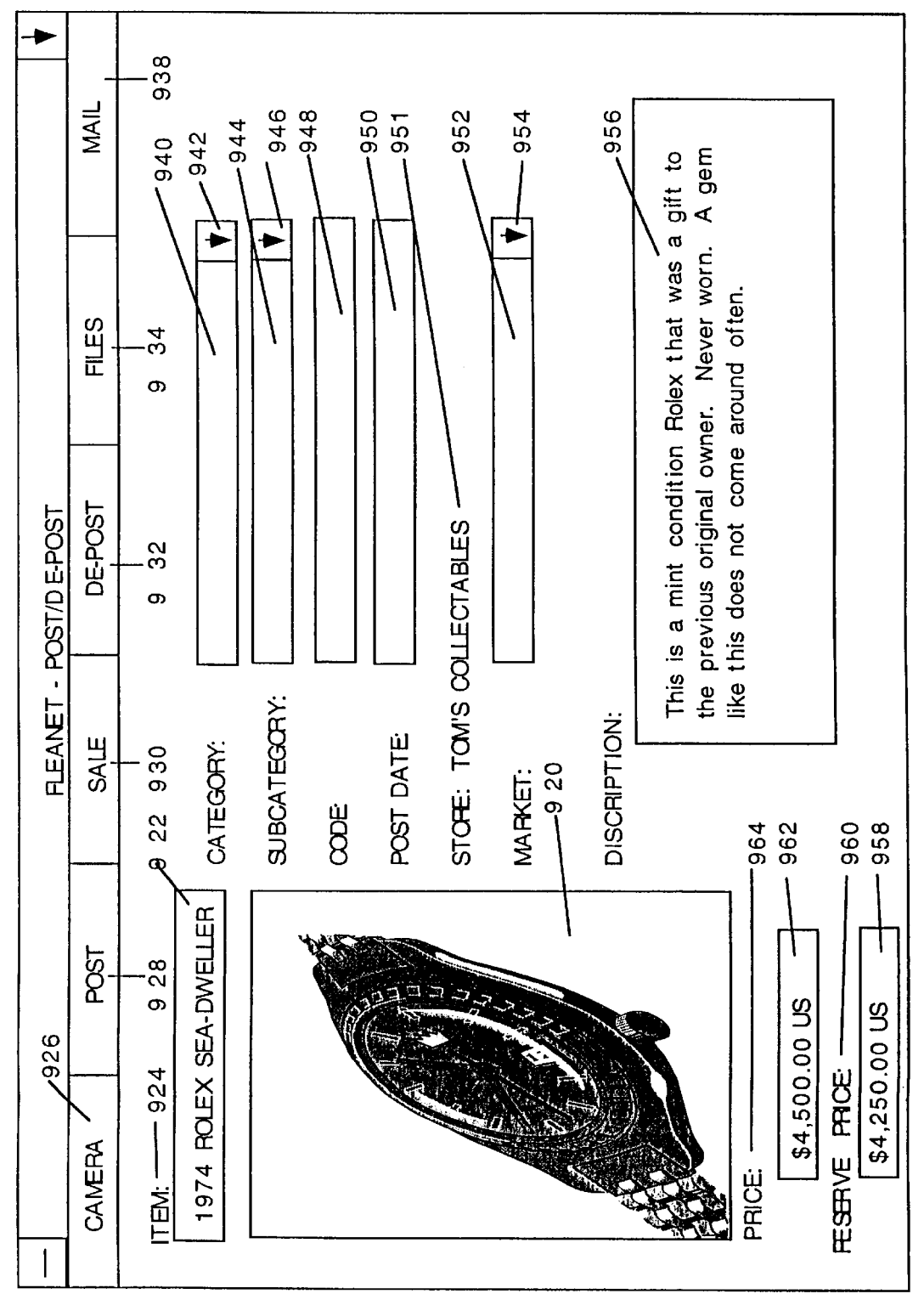

FIG. 13 shows an example of a graphical user interface that may be presented to a posting terminal 700 user. The graphical user interface for the posting terminal 700 may include an image of the item represented by the record 920, a description of the item 922, and 924, the "push button" commands to receive pictures from the digital camera 926, to post a record 928, to clear a local sale 930, to de-post a record 932, to access files of records 934, to view and/or receive and send mail 938, a database category field 940 with a pull down selection bar 942, a database subcategory 944 with a pull down selection bar 946, a code field 948, a posting date field 950, a store identification 951, a market designator field 954, a description field 956, a reserve or wholesale price field 958, and identifier 960, a retail or full price field 962 and identifier 964. The category 940 and sub-category 944 data fields are restricted to selections that can be made by the respective pull down bars 942 and 946. This aids the posting terminal operator in selecting the correct market for the good when creating a record and assures that all records can properly link into a market computer 900 market database. A file may be stored at posting terminal 700 that corresponds to database structure at the market maker computer 800. Having the database structure in a file at posting terminal 700 may allow the posting terminal to receive updates by remote file transfer techniques, such as the KERMIT, FTP, xmodem and ymodem protocols. It is understood that certain selections from the market category 940 and subcategory fields may be "greyed" or that is blocked from selection by a posting terminal 700 user to enforce a franchise and/or license grant that only allows posting in a certain field. This may allow a franchising scheme that restricts a franchisee to a field of use and/or category of goods. The code field 948 displays the bar code data in text form that the market maker computer 900 sends to the posting terminal 700 when a record is successfully posted. Therefore, the code field 948 can serve as a quick visual confirmation to the posting terminal user that the displayed record has been posted. The market field 952 may also be a restricted selection field accessible by pull down selection bar 954. Fields selectable by the market field 952 may include auction, on-sale, hold and the like to give additional directionality to the record posting. The price 964 and reserve price fields 958 may be used to structure the two-tiered market of dealer-to-dealer and retail markets. The reserve price identifier 960 and reserve price field 958 may be hidden from view to retail participants. A dealer may be provided with special logon identifications and passwords to view the reserve price 958 and reserve price indicator 960. This feature encourages franchisees to use the electronic market for collectable goods dealer participant interface to generate local sales.

The posting terminal 700 user enters descriptions such as the name of the item, the sale price of the item, and a brief description of the item and the like to compose a record. It is understood that a posting terminal user may enter a retail price and a wholesale price. The retail price may then be displayed to participants 900. Other retail participants 902 may receive the wholesale price. It is understood that this two-tiered pricing scheme may be used to network retail store owners to provide additional incentives for the retail participants to use the network to locate goods and generate sales at the retail point of sale. For example, a retailer may charge the retail price for goods to store customers, while obtaining the benefits, e.g. the profit margin of wholesale or discounted pricing for goods. It is understood that the restricted fields are coordinated with the structure of the For-Sale database 814 to guide a posting terminal 700 user in the proper selection of a market category and subcategory of the posting of a good. Categories may include jewelry, rugs and tapestry, tools, quilts, furniture, art deco, books, pens, coins, stamps and costumes and clothing. Subcategories may include painting and drawings, sculpture, vintage clothing, costumes, shoes, bags, hats, wedding gowns, furs, rug types and the like to structure the database. The user may also select from a list box what category and sub-category from restricted fields in which to post a good. Referring back to FIG. 12, the user may store a composed record on the storage device 710. The record maker routine may also contain a command button 706 to immediately post the record 708. It is understood that the user may designate a time at which the posting terminal 700 may automatically contact the market maker computer 800 and post the selected goods. The post request 716 module may allow a user to select records from storage unit 710 or as in the case where the user selected the immediate post command 708, the post module 712 may accept a record as an input. The ability of the posting terminal 700 to store and select records for posting asynchronously from when a record is created allows a user to compose records when the posting terminal is isolated from communication with a market maker computer 800. The post module 712 may invoke the post request module 716 to post the designated records on the market and make a virtual presentment of a good. Rules and procedures may be imposed on the posting terminal 700 user through licensing and franchise agreements. Such rules may include the requirement that all goods posted must be in the physical and legal possession of the posting terminal franchisee or licensee, that legal possession of a good may be obtained by lawful ownership or through a franchise approved bailment or consignment contract. It is understood that these rules and legal frame work may be imposed to allow the posted record to convey a legal title to a good such that the ownership designated in the record grants lawful ownership to the good designated by the record. The post request module 716 may use a communication package and protocols to transfer the records to the market maker computer 800. Communication libraries are packaged and are commercially available from WCSC 2740 S. Dairy Ashfor, Suite 188, Houston Tex. 77077 and from Marshallsoft Computing, Inc. at P.O. Box 4543 Huntsville, Ala. 35815. The communication protocols such as FTP and KERMIT may be enhanced by using known encryption and authentication techniques to provide an ultra-secure posting interface. The posting record may also include a header that identifies a store identification, user identification, passwords and the like to allow the market maker computer 800 to verify authenticity, approve authorization and track usage of the posting terminal 700 by a particular posting terminal 700 and posting terminal user.

The market maker computer 800 may verify and accept a record and generate and send a unique bar code number for each record. The bar code number may contain a code that identifies a posting terminal 700. The posting terminal accepts the bar code and places the code in the appropriate record. The unique code generated for each successfully posted record may serve as confirmation that a good has been successfully posted. The record may then be stored on storage unit 722 as a confirmed posted record. When the posting terminals' post request module 716 is finished, the posting terminal 700 or the market maker computer 800 may invoke a mail update routine 720 to pass mail from the market maker computer 800 to the posting terminal 700. Mail topics may include sales information 734, network news 736, and notification of upcoming events 738. The de-post module 724 may use the bar code scanner 730 to receive a posted collectible's identification code. The de-post module 724 may call the de-post request routine 728 to establish communications between the posting terminal 700 and the market maker computer 800. The de-post request module 728 sends the item br collectible bar code to the post/de-post handler 802. The post/de-post handler 802 may remove the collectible identified by the bar code from the for-sale database 814, if the de-posting terminal identification has legal title to the identified collectible as indicated in a for-sale record, the market maker computer 800 may send a de-post confirm code to the posting terminal 700. The posting terminal 700 may process the confirm signal by indicating that the de-posting procedures was performed. If legal title to the posted collectible good does not belong to the de-posting requesting entity, e.g., the de-posting terminal 700 then indicated by the posting terminal identification, the market maker computer 800 may report the collectible good status, e.g., sold!, to the de-post request module 728. This may indicate to the posting terminal user that a bailee relationship now exists between the store and the new legal owner. It is understood that this bailee relationship may be contractually created and enforced through the franchise contract between the posting terminal user and the franchise granting authority. It is also understood that the bailee agreement may be for a predetermined time and/or require the posting terminal user to hold a good for a predetermined time and/or ship the good to a long term storage facility to ease the bailee burden of posting terminal users where a participant elects to hold legal ownership but keep the good available in the electronic market place for the long term. It is understood that a bond and/or insurance requirements may be required for the posting terminal user and/or the long term storage facility to provide assurance to a long term collectible investor that the risk of loss of the collectable good asset is maintained or at least hedged against loss. It is understood that a good may have sold and the new owner has elected to re-sell the good at a higher price. In this instance, the de-posting terminal will be advised that the good has been sold and advised of the new sales price. The posting terminal may then transact the local sale at the new price. After the de-post request module 728 is finished it may invoke or the market maker computer 800 may invoke the get mail routine 720 to send mail between the market maker computer 800 and the posting terminal 700. It is understood that through the procedures of generating a unique code for each posted good, checking a unique code that identifies each posting terminal 700 against the legal owner entry in a posted good on the market maker computer 800 the database of for-sale goods 814 will be extremely reliable and accurate and assure that a locally sold goods that have already been sold on the market maker computer 800 will not be inadvertently sold twice. The procedures, when used in conjunction with the rules and procedures imposed on the posting terminal user through a franchising or licensing legal framework assure that (1) when a record of a good is found on the market maker computer 800 by a participant 900 or another retailer 902, it is in fact for-sale and is in the physical and legal possession of a "trusted" franchise and (2) that when a bona fide purchase price is tendered by a participant 900 or another retailer 902 the legal title to a good as represented by the record will transfer to the buyer with an immediate or nearly immediate finality to the transaction. This frame work of trusted franchisee, high confidence and accurate market database, and the legal finality of transaction, where the legal transaction/"cash" clearing function is performed by the market maker computer, e.g., the participant credit card number or other payment means is only revealed and brokered by the market maker computer 800, is a massive step toward building confidence and trust between a small collectable merchant and participant with electronic transactions. These procedures may be used to give assurances and create trust to participants, who for example would like to buy and art deco collectable from a collectable shop in Russia but is very reluctant to send credit card information to an unknown Russian collectable shop for the obvious concerns of credit card fraud and/or fraud in the bona fides of the collectable good itself. Here, however, the franchising authority polices the franchisees to revoke the franchise if a fraud and/or misrepresentations of the bona fides of a collectable good is taking place by the posting terminal user and the assurance that credit card numbers are only revealed to the market maker computer 800 and not accessible to the, in this example, the Russian collectable store. This allows the Russian collectible store to receive the business good will of the electronic collectible market place of the present invention to establish immediate trust with prospective electronic customers.

The market maker computer 800 may have mail module 801, a post/de-post handler module 802, a security module 804, database server 806, a database to www map module 808, a www page server 810, a transaction processor 812, a for-sale database 814, a sold database 816, a shipped database 820, and an account database 824. A www to database mapping 808 module is commercially available from Expertelligence, Inc., Santa Barbara, Calif. at (805) 962-2558. Such a mapping module may map a ODBC database such as Microsoft Access to a www page. The market maker computer 800 may serve four primary functions. The first function is the call handler for processing calls from a posting terminals 700. The second function is a database to www mapping function to present participants 900 and other retailers 902 with a means to access the market database. The third function is to provide a means to process transactions from participants by clearing a transaction and transferring legal title to a good. The fourth function is to provide a means for managing the notification of the sale of a good to posting terminals 700.

The market maker computer 800 may use an accounts 824 database to track payments due to posting terminal 700 users. The clear accounts 825 module may print checks due to posting terminal 700 users. It is understood that electronic funds transfer techniques may be used for clearing account balances 825 for posting terminal users. A modem bank 803 may be used to receive posting calls from posting terminals. It is understood that the modem bank may be replaced by a network connection to the internet. At this juncture it is believed that an off-line, that is a modem bank, connection offers the best security for the posting of goods. However, it is understood that a network connection, e.g. through the internet, is within the scope of the present invention.

A security module 804 may be used to provide identification and password security. It is understood that other security and authentication techniques may be used at security module 804. It is understood that database server 806 may be an ODBC server available from many commercial database providers. Much of the market maker computers 800 functionality is disclosed above in the consignment node functionality. The databases may be structured to indicate of for-sale 814 database and sold database 816, and auction database 817 and a shipped database 820. It is understood that records may move between the databases by book entry transaction. The transaction processor 812 may use RSA certificates and/or other well-known techniques to process secured transactions between the market maker computer 800 and participants 702 and 902. It is understood that the transaction processor 812 may interface with external payment systems 826. It is understood that participant accounts may be tracked at the market maker computer 800. Moreover, it is understood that account surpluses may be acquired by participants speculating in collectable goods may be invested in highly liquid and safe assets such as U.S. Treasury bills to provide and interest bearing accounting for positive cash balances. This provides an incentive, or at least a hedge against inflation, for a participant to keep funds within the collectible market place and to use these funds to speculate in the collectible market. By using funds available at the market maker computer 800 participants can reduce the transaction costs associated with credit cards and other transaction clearing means and optimize the participants' return on price movements in the buying and selling of collectable goods. It is within the scope of the present invention to allow access to the electronic collectable market through stock brokers, banks, and other transaction providers through these providers private transaction networks, e.g., those networks that use dial in telephone lines to home computers and/or dedicated data lines. It is within the scope of the present invention to allow professional investment advisors to operate funds such as investment companies, mutual fund partnerships and the like, that use collectable goods as part of the funds assets. It is understood that the market "history" may be archived and provided to investment advisors and/or posting terminal users and/or participants on a CD-ROM or other mass storage medium to allow off-line analysis of trends in the collectable goods market. This will allow or create a new class of "learned" speculators in this unique, novel and non-obvious electronic market place and network of trusted franchisees in the collectable goods domain. It is also within the scope to the present invention to create the liquidity, volume and availability analysis to allow the creation of a secondary and derivative market for option and futures contracts and other speculative constructs to be created with the underlying assets as collectable goods in the electronic market place of the present invention.

Many variations of the present invention are possible once the present invention is known to those skilled in the arts and are within the spirit and scope of the present invention. Those skilled in the arts will be able to make many variations on the present invention once this invention is known to the arts.

Therefore, I claim:

1. An automated method, performed by a computer-based auction system, for enabling a seller to auction a uniquely identified item via the Internet to one or more potential buyers, the method comprising:

requiring the seller to establish a seller's account, the seller's account being based at least on the seller's identity and a financial instrument associated with the seller;

receiving information from the seller including a description of an item offered for auction by the seller;

creating a data record containing a description of the item based on the information received from the seller, the data record connoting an ownership interest by the seller in the item, the data record being stored in a computerized electronic database maintained by the computer-based auction system;

generating an identification code to uniquely identify the item;

scheduling an auction for the item, the auction to be hosted by the computer-based auction system;

presenting the item for auction to an audience of participants through a worldwide web mapping module executing in conjunction with the computerized database, the worldwide web mapping module translating information from the data record to a hypertext mark up language format for presentation through the Internet;

receiving bids on the item from participants via the Internet through an auction process that executes in conjunction with the computerized database;

terminating the auction for the item when the auction process encounters predetermined criteria;

notifying a winning auction participant that the winning auction participant has entered a high bid in the auction process;

providing the unique identification code to the winning auction participant to uniquely identify the item; and charging a fee to the seller's account based on an amount of the high bid.

2. The method of claim 1 further comprising:

accepting payment information from an auction participant before accepting bids at the auction process from the auction participant.

3. The method of claim 2 wherein the payment information comprises credit card payment information and further comprising:

processing the credit card payment information to authorize payment before accepting a bid from the auction participant.

4. The method of claim 1 further comprising:

contracting with the seller to create a binding offer to auction the item through auction process.

5. The method of claim 1 further comprising:

providing payment instructions to the winning auction participant in the auction process.

6. An apparatus for conducting fully automated simultaneous Internet auctions, the apparatus comprising:

a computer system operationally connected to the Internet;

a process executing on the computer system for automatically establishing a seller's account based on information received from a seller, the seller's account being based at least on the seller's identity and a financial instrument associated with the seller;

a storage device operationally connected to the computer system, the storage device storing a database of data records, each data record identifying an item to be auctioned by the computer system;

a data interface operationally connected to the computer system, the data interface providing electronic connectivity between the computer system and the Internet;

a worldwide web-to-database mapping module, the worldwide web-to-database mapping module providing a link between a hypertext mark up language page server and the storage device;

an electronic mail module operationally connected to the data interface and executing on the computer system, the electronic mail module providing an information link to the seller of the item for auction represented by the data record stored by the data storage device;

the computer system executing an auction program that schedules multiple simultaneous auctions of items, the auction program automatically determining an opening bid for a particular item and determining whether the particular auction is with or without reserve; and a process executing on the computer system for automatically charging the seller's account a fee amount corresponding to a result of the auction.

7. The apparatus of claim 6 further comprising:

a transaction processing module connected to the data interface, the transaction processing module receiving payment information from participants of the multiple simultaneous auctions.

8. The apparatus of claim 7 further comprising:

an accounting module connected to the transaction processing module, the accounting module maintaining the sellers' accounts for sellers in the multiple simultaneous Internet auctions.

9. The apparatus of claim 6 further comprising:

a tracking code generator module connected to the data interface, the tracking code generator module generating tracking codes to uniquely track items for auction.

10. A method, performed by a computer-based auction system, for auctioning used goods and collectibles using a computerized electronic database of data records maintained by the auction system, the method comprising:

requiring a seller to establish a seller's account, the seller's account being based at least on the seller's identity and a financial instrument associated with the seller;

creating a data record containing a description of a unique used or collectable good, the data record connoting an ownership interest by the seller in the unique used or collectable good;

entering in the data record a reserve price for the unique used or collectable good;

scheduling an auction for the unique used or collectable good, the auction being hosted by the computer-based auction system;

presenting the used or collectable good for auction to an audience of participants through a worldwide web mapping module executing in conjunction with the computerized electronic database of records, the worldwide web mapping module translating information from the data record to a hypertext mark up language for presentation via the Internet to the audience of participants;

receiving bids at the auction system via the Internet for the unique used or collectable good from participants;

terminating the auction for the unique used or collectable good when an auction process reaches a predetermined termination point;

debiting the seller's account for a fee amount corresponding to a result of the auction; and notifying a winning auction participant of a successful high bid.

11. An apparatus for conducting fully automated simultaneous Internet auctions, the apparatus comprising:

a computer system operationally connected to the Internet;

a process executing on the computer system for automatically establishing a seller's account based on information received from a seller, the seller's account being based at least on the seller's identity and a financial instrument associated with the seller;

a storage device operationally connected to the computer system, the storage device storing a data record in a database of data records, wherein the data record identifies an item to be auctioned by the computer system via the Internet;

a data interface operationally connected to the computer system, the data interface providing electronic connectivity between the computer system and the Internet;

a worldwide web-to-database mapping module, the worldwide web-to-database mapping module providing a link between a hypertext mark up language page server and the storage device;

an electronic mail module operationally connected to the data interface and executing on the computer system, the electronic mail module providing an information link to the seller of the item for auction represented by the data record stored by the storage device;

the computer system executing an auction program that schedules multiple simultaneous auctions of items, the auction program automatically determining an opening bid for a particular item and determining whether the particular auction is with or without reserve, the auction program providing auction results via the electronic mail module to the seller and a highest bid auction participant; and a process executing on the computer system for automatically charging the seller's account a fee amount corresponding to a result of the auction.

12. A computer-implemented method of facilitating Internet-based auctions, the method comprising:

requiring a seller to establish a seller's account, the seller's account being based at least on the seller's identity and a financial instrument associated with the seller;

initiating an Internet-based auction for an item offered by the seller; and debiting the seller's account for a fee amount corresponding to a result of the auction.

13. The method of claim 12 wherein requiring the seller to establish a seller's account comprises:

receiving account information from seller, the received account information comprising identity information and financial instrument information;

verifying the account information received from the seller; and establishing a seller's account for the seller.

14. The method of claim 12 wherein the financial instrument comprises a credit card, a debit card or a debit account.

15. The method of claim 12 further comprising receiving item information from the seller, the received item information comprising a description of an item offered for auction by the seller.

16. The method of claim 15 wherein the received item information further comprises an item category designated by the seller.

17. The method of claim 15 further comprising creating a data record based on the received item information.

18. The method of claim 12 wherein initiating the auction for the seller's item comprises:

receiving item information from the seller, the received item information including a description of an item offered for auction by the seller;

creating a data record based on received item information;

mapping the created data record to an Internet-compatible format; and presenting the item to one or more potential bidders.

19. The method of claim 18 further comprising:

receiving at least one bid from the one or more potential bidders; and terminating the auction upon occurrence of a predetermined event.

20. The method of claim 19 wherein the predetermined event comprises a lapse of a time duration.

21. The method of claim 19 wherein the predetermined event comprises the receipt of a final high bid.

22. The method of claim 19 wherein the predetermined event comprises receiving a bid that meets a seller-specified reserve price.

23. The method of claim 12 wherein debiting the seller's account comprises:

automatically calculating the fee amount based on a result of the auction; and automatically charging the calculated fee amount to the seller's financial instrument associated with seller's account.

24. The method of claim 12 wherein the fee amount is based, at least in part, on a final sales price of the item.

25. The method of claim 12 wherein the fee amount is based on a percentage of a final sales price of the item.

26. The method of claim 12 wherein the fee amount represents a seller's commission paid to an entity hosting the Internet-based auction.

27. The method of claim 12 wherein the fee amount is based on one or more parameters other than final sales price of the item.

28. The method of claim 12 wherein debiting the seller's account occurs upon conclusion of the auction.

29. The method of claim 12 wherein debiting the seller's account occurs prior to conclusion of the auction.

30. The method of claim 12 wherein debiting the seller's account is independent of a sales transaction between the seller and a buyer of the item.

31. The method of claim 12 wherein the seller must establish a seller's account before the seller is allowed to initiate auctions.

32. The method of claim 12 further comprising:

after establishing a seller's account, receiving item information from the seller describing an item to be auctioned;

prior to initiating an auction, automatically generating a data record corresponding to the seller's item to be auction; and wherein the Internet-based auction for the item offered by the seller is initiated automatically based on the automatically generated data record.

33. The method of claim 12 wherein the computer-implemented method of facilitating Internet-based auctions is performed by a computer-based auction system under a first entity's control, and wherein the method further comprises:

requiring the seller to establish the seller's account comprises verifying the seller's identity and the financial instrument information;

receiving information from a computer system independently operated by the seller, the received information describing an item to be auctioned; and wherein the Internet-based auction for the seller's item is initiated while the item remains outside of the first entity's possession.

34. The method of claim 33 wherein the Internet-based auction for the seller's item is initiated while the item remains outside of the first entity's control.

35. The method of claim 33 wherein the Internet-based auction for the seller's item is initiated while the item remains in the seller's possession and control.

36. A computer-based auction system for facilitating Internet-based auctions, the auction system comprising:

(a) a computer system in communication with the Internet and capable of executing a plurality of substantially simultaneous processes;

(b) one or more processes executing on the computer system to perform the following:

(i) establish a seller's account based on information received from a seller, the seller's account being based at least on the seller's identity and a financial instrument associated with the seller;

(ii) initiate an auction instance based on information received from the seller describing an item offered for auction by the seller; and (iii) charge the seller's account a fee amount based on the initiated auction instance.

37. The auction system of claim 36 wherein the initiated auction instance comprises an independent auction instance executing substantially simultaneously with a plurality of other auction instances.

38. The auction system of claim 36 wherein the one or more processes executing on the computer system are capable of automatically generating a plurality of independent auction instances that execute substantially simultaneously.

39. The auction system of claim 36 wherein the initiated auction instance is specific to a particular item or to a lot of related items.

40. The auction system of claim 36 wherein the initiated auction instance is specific to a particular seller.

41. The auction system of claim 36 wherein the initiated auction instance corresponds to a plurality of unrelated items.

42. The auction system of claim 36 wherein the initiated auction instance corresponds to a plurality of unrelated sellers.

43. The auction system of claim 36 wherein the fee amount charged to the seller's account represents a seller's commission.

44. The auction system of claim 36 wherein the fee amount charged to the seller's account depends on a final sales price of the item being auctioned.

45. The auction system of claim 44 wherein the fee amount charged to the seller's account comprises a percentage of the final sales price of the item being auctioned.

46. The auction system of claim 36 wherein the financial instrument associated with the seller comprises a credit card, a debit card or a debit account.

47. The auction system of claim 36 wherein initiating an auction instance comprises:
   automatically generating a data record corresponding to the seller's item to be auctioned; and
   automatically initiating the auction instance based on the automatically generated data record.

48. The auction system of claim 36 wherein:
   the computer-based auction system is under a first entity's control;
   the information describing the item offered for auction is received from a computer system independently operated by the seller; and
   the auction instance for the seller's item is initiated while the item remains outside of the first entity's possession.

49. The auction system of claim 48 wherein the auction instance for the seller's item is initiated while the item remains outside of the first entity's control.

50. The auction system of claim 48 wherein the auction instance for the seller's item is initiated while the item remains in the seller's possession and control.

51. A computer-implemented method of conducting Internet-based auctions, the method comprising:
   receiving account information from a seller, the received account information identifying the seller and a financial instrument associated with the seller;
   automatically establishing a seller's account based on the received account information, the seller's account being associated with the seller from whom the account information was received;
   receiving item information from the seller, the received item information comprising a description of an item to be offered for auction by the seller;
   automatically generating a data record corresponding to the item to be offered for auction based on the received item information;
   automatically mapping the generated data record to an Internet-compatible presentation format;
   automatically initiating an auction for the item, the initiation of the auction including making available for presentation via the Internet the mapped Internet-compatible presentation format;
   receiving via the Internet at least one bid for the item from one or more bidders;
   automatically terminating the auction upon occurrence of one or more predetermined events;
   automatically notifying a winning bidder of winning the item at a final bid price;
   automatically calculating a fee amount to be charged the seller based on the final bid price; and
   automatically debiting the seller's account for the calculated fee amount.

52. An automated method, performed by a computer-based auction system, for conducting multiple simultaneous person-to-person auctions via a computer auction system connected to a data packet network via the word wide web in a fully automated, topically arranged system that can be searched by topical categories, and wherein sellers and buyers are automatically and immediately notified via email when an auction is completed, the computer-based auction system being under the control of a first entity, the method comprising:
   establishing a seller's account in the computer-based auction system wherein the seller, via an independently operated seller's computer system, specifies a financial instrument against which a seller's commission may be automatically charged by the computer-based auction system;
   after establishing the seller's account, receiving via the data packet network from the seller a description of an item offered for auction, the received description including a category selected from a list of categories provided by the auction system;
   in response to receiving a description of an item for auction from a seller, generating a unique tracking identifier for the item;
   displaying, in response to a search request from a buyer, the description of the item for auction in a presentation format via the world wide web, the display including advertisements that generate revenue for the auction system;
   automatically auctioning the item for auction posted by the seller, the auction being conducted while the item for auction remains outside of the first entity's possession;
   receiving at least one bid for the item for auction from at least one bidder via a world wide web interface;
   automatically calculating a seller's commission based on the final bid price for the item for auction; and
   automatically charging the seller via the seller's account the calculated seller's commission.

* * * * *

US006202051C1

(12) EX PARTE REEXAMINATION CERTIFICATE (9019th)

United States Patent
Woolston

(10) Number: US 6,202,051 C1
(45) Certificate Issued: May 22, 2012

(54) FACILITATING INTERNET COMMERCE THROUGH INTERNETWORKED AUCTIONS

(75) Inventor: Thomas G. Woolston, Alexandria, VA (US)

(73) Assignee: eBay, Inc., San Jose, CA (US)

Reexamination Request:
No. 90/006,984, Mar. 29, 2004
No. 90/008,362, Apr. 3, 2007

Reexamination Certificate for:
Patent No.: 6,202,051
Issued: Mar. 13, 2001
Appl. No.: 09/253,021
Filed: Feb. 19, 1999

Related U.S. Application Data

(60) Division of application No. 09/166,779, filed on Oct. 6, 1998, which is a continuation of application No. 08/554,704, filed on Nov. 7, 1995, now Pat. No. 5,845,265, and a continuation of application No. 08/427,820, filed on Apr. 26, 1995, now abandoned.

(51) Int. Cl.
*G06Q 30/00* (2006.01)

(52) U.S. Cl. .............................. 705/27; 705/26; 705/37
(58) Field of Classification Search ........................ None
See application file for complete search history.

(56) References Cited

To view the complete listing of prior art documents cited during the proceedings for Reexamination Control Numbers 90/006,984 and 90/008,362, please refer to the USPTO's public Patent Application Information Retrieval (PAIR) system under the Display References tab.

*Primary Examiner* — Joseph R. Pokrzywa

(57) ABSTRACT

Auctioning an uniquely identified item (e.g., used goods or collectibles) with a computerized electronic database of data records on the Internet includes creating a data record containing a description of an item, generating an identification code to uniquely identify the item, and scheduling an auction for the item at the computerized database of records. The item is presented for auction to an audience of participants through a worldwide web mapping module executing in conjunction with the computerized database. The data record connotes an ownership interest in the item to a seller participant on the computerized electronic database of data records. The worldwide web mapping module translates information from the data record on the computerized database of records to a hypertext markup language (HTML) format for presentation through the Internet. Bids are received on the item from participants on the Internet through an auction process that executes in conjunction with the computerized database of data records. Auctioning of the item is terminated when the auction process reaches predetermined criteria. The auction participant is notified of the high bid in the auction process. The unique identification code is provided to the auction participant with the high bid to uniquely identify the item.

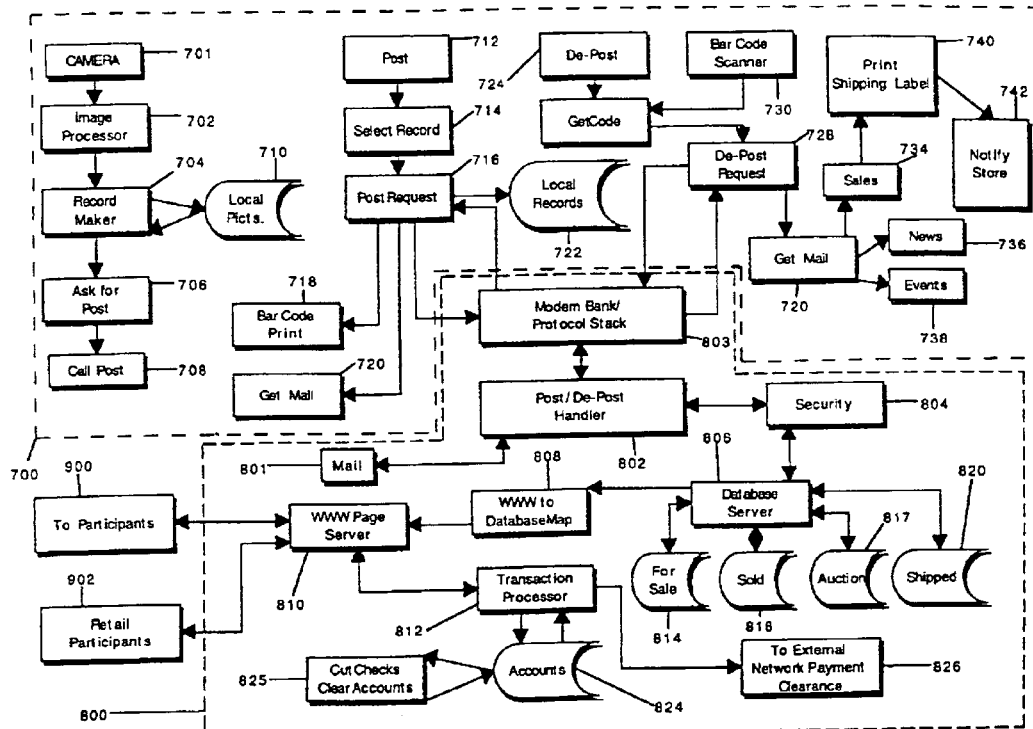

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claim 52 is confirmed.

Claims 1-51 are cancelled.

* * * * *